US011962198B2

(12) United States Patent
Miyashita

(10) Patent No.: US 11,962,198 B2
(45) Date of Patent: Apr. 16, 2024

(54) ELECTRIC MOTOR HAVING MAGNET MOUNTED TO MAGNET MOUNTING PORTION OF SHAFT AND METHOD FOR MANUFACTURING THE SAME

(71) Applicant: MITSUBA Corporation, Gunma (JP)

(72) Inventor: Naoyuki Miyashita, Gunma (JP)

(73) Assignee: MITSUBA Corporation, Gunma (JP)

( * ) Notice: Subject to any disclaimer, the term of this patent is extended or adjusted under 35 U.S.C. 154(b) by 532 days.

(21) Appl. No.: 17/271,198

(22) PCT Filed: Feb. 18, 2019

(86) PCT No.: PCT/JP2019/005806
§ 371 (c)(1),
(2) Date: Feb. 24, 2021

(87) PCT Pub. No.: WO2020/054095
PCT Pub. Date: Mar. 19, 2020

(65) Prior Publication Data
US 2021/0336499 A1    Oct. 28, 2021

(30) Foreign Application Priority Data

Sep. 14, 2018   (JP) .................................. 2018-172838

(51) Int. Cl.
*H02K 1/2733*    (2022.01)
*B23P 19/02*    (2006.01)
(Continued)

(52) U.S. Cl.
CPC ................ *H02K 1/30* (2013.01); *B23P 19/02* (2013.01); *H02K 1/2733* (2013.01); *H02K 15/03* (2013.01); *H02K 21/16* (2013.01); *B60T 13/746* (2013.01)

(58) Field of Classification Search
CPC .... H02K 1/2733; H02K 1/2726; H02K 1/278; H02K 1/28; H02K 1/30; H02K 21/16
(Continued)

(56) References Cited

U.S. PATENT DOCUMENTS 4,742,259 A    5/1988  Schaefer et al.
2016/0149461 A1*  5/2016  Kono ..................... H02K 5/128
                                                    310/86
(Continued)

FOREIGN PATENT DOCUMENTS

JP    S57173364    10/1982
JP    H05344669    12/1993
(Continued)

OTHER PUBLICATIONS

Aona, Machine Translation of WO2019003800, Jan. 2019 (Year: 2019).*
(Continued)

*Primary Examiner* — Eric Johnson
(74) *Attorney, Agent, or Firm* — JCIPRNET

(57) ABSTRACT

Provided is a high-quality electric motor which can be manufactured at a high yield rate. An electric motor comprises a stator which is housed in a motor case, and a rotor which is provided with a shaft and a rotor body section. The shaft is rotatably supported by the motor case, and the rotor body section has a ring magnet disposed inside the stator. A magnet cover into which the rotor body section is inserted has a circular cylinder section which covers the outer peripheral surface of the ring magnet, a turned-back section which is in contact with an end surface of the rotor body section, and a fastening end section which is fastened to a flange section provided to the shaft so as to cover an end surface. An engagement latch section engaging with the rotor is provided to the turned-back section.

12 Claims, 20 Drawing Sheets

(51) Int. Cl.
*H02K 1/30* (2006.01)
*H02K 15/03* (2006.01)
*H02K 21/16* (2006.01)
*B60T 13/74* (2006.01)

(58) Field of Classification Search
USPC .................................... 310/156.28–156.29
See application file for complete search history.

(56) References Cited

U.S. PATENT DOCUMENTS

| | | | |
|---|---|---|---|
| 2017/0302142 A1 | 10/2017 | Kawaguchi et al. | |
| 2020/0153294 A1* | 5/2020 | Aono | ........................ H02K 1/27 |

FOREIGN PATENT DOCUMENTS

| | | |
|---|---|---|
| JP | H11299149 | 10/1999 |
| JP | 2002010543 | 1/2002 |
| JP | 2005020887 | 1/2005 |
| JP | 2006025509 | 1/2006 |
| JP | 2006087276 | 3/2006 |
| JP | 2008029144 | 2/2008 |
| JP | 2008295140 | 12/2008 |
| JP | 2015204719 | 11/2015 |
| JP | 2016111806 | 6/2016 |
| JP | 2017028837 | 2/2017 |
| WO | 2018119856 | 7/2018 |
| WO | WO-2019003800 A1 * | 1/2019 .............. H02K 1/22 |
| WO | WO-2022007669 A1 * | 1/2022 |

OTHER PUBLICATIONS

Sun, Machine Translation of WO2022007669, Jan. 2022 (Year: 2022).*
Shibata, Machine Translation of JP2008029144, Feb. 2008 (Year: 2008).*
Yamamura, Machine Translation of JP2006087276, Mar. 2006 (Year: 2006).*
Nakayama, Machine Translation of JP2008295140, Dec. 2008 (Year: 2008).*
"International Preliminary Report on Patentability (Form PCT/IPEA/409) of PCT/JP2019/005806," completed on Sep. 30, 2020, with English translation thereof, pp. 1-27.
"Search Report of Europe Counterpart Application", dated Sep. 30, 2021, pp. 1-12.
"International Search Report (Form PCT/ISA/210) of PCT/JP2019/005806," dated May 21, 2019, with English translation thereof, pp. 1-4.

* cited by examiner

ELECTRIC MOTOR HAVING MAGNET MOUNTED TO MAGNET MOUNTING PORTION OF SHAFT AND METHOD FOR MANUFACTURING THE SAME

CROSS-REFERENCE TO RELATED APPLICATION

This application is a 371 application of the International PCT application serial no. PCT/JP2019/005806, filed on Feb. 18, 2019, which claims the priority benefits of Japan Patent Application No. 2018-172838, filed on Sep. 14, 2018. The entirety of each of the above-mentioned patent applications is hereby incorporated by reference herein and made a part of this specification.

BACKGROUND

Technical Field

The present invention relates to an electric motor having a magnet which is mounted to a magnet mounting portion of a shaft directly or via a rotor core, and relates to a method for manufacturing electric motor.

Related Art

An electric motor may be an inner rotor type electric motor including: a stator in which an armature winding is arranged and which is housed in a motor case; a shaft which is rotatably supported by the motor case; and a magnet, that is, a permanent magnet, which is mounted to the shaft and disposed inside the stator. In the inner rotor type electric motor, there is a form in which the magnet is mounted to a magnet mounting portion of the shaft directly, and a form in which the magnet is mounted to the magnet mounting portion of the shaft via a rotor core.

Electric motors in which a magnet is protected by covering the magnet by a magnet cover are described in Patent literatures 1 and 2. The electric motor described in Patent literature 1 has a rotor cover, that is, the magnet cover, which has a circular cylinder portion which covers the outer peripheral of the magnet, a first clamping portion which is bent from one end portion of the circular cylinder portion, and a second clamping portion which is bent from the other end portion of the circular cylinder portion. In a state in which a rotor core unit including the rotor core and the magnet is housed in the magnet cover in which the first clamping portion on a bottom portion side is formed, a press working is performed on the second clamping portion on an opening end portion side. Both of the clamping portions are closely adhered to an end surface of the magnet.

The electric motor described in Patent literature 2 has two magnet covers respectively having a cup-shaped cross-section, one magnet cover covers one side of the magnet in an axial direction, and the other magnet cover covers the other side of the magnet in the axial direction. A bending piece of each magnet cover is fitted to a wall thickness reduction portion formed in the rotor core, and the magnet cover is prevented from rotating with respect to the magnet.

LITERATURE OF RELATED ART

[Patent Literature]

Patent literature 1: Japanese Patent Laid-Open No. 2017-28837

Patent literature 2: Japanese Patent Laid-Open No. 2008-295140

SUMMARY

[Problems to be Solved]

When the electric motor is used, if the magnet cover rotates with respect to the magnet, the magnet cover will rub against the magnet, which generates an abnormal noise or damages the magnet, and the quality of the motor cannot be improved. Thus, the magnet cover is required to be attached so as to not rotate with respect to the magnet.

However, if the magnet cover is press-fitted or firmly tightened to the outer peripheral surface of the magnet so as to prevent the rotational movement of the magnet cover with respect to the magnet, there is a possibility that the magnet will be damaged when the rotor is assembled. If the press working is performed on the second clamping portion in a state in which the rotor core unit is housed in the magnet cover as the magnet cover described in Patent literature 1, there is a possibility that both of the clamping portions will be pressed against the end surface of the magnet, and the magnet will be damaged. In addition, if the two magnet covers are attached to the magnet as described in Patent literature 2, the circular cylinder portion of the magnet cover will be required to be firmly fastened to the outer peripheral surface of the magnet in order to prevent the magnet cover from coming off the magnet, and there is a possibility that the magnet will be damaged.

In this way, if the magnet is damaged when the magnet cover is assembled to the magnet, the electric motor formed in that way cannot be commercialized, and a manufacture yield rate of the electric motor will be reduced.

An object of the present invention is being capable of manufacturing a high-quality electric motor at a high yield rate.

[Means to Solve Problems]

An electric motor of the present invention includes: a stator which is housed in a motor case; and a rotor which includes a shaft being rotatably supported by the motor case and a rotor body portion having a magnet disposed inside the stator. The electric motor has a magnet cover including: a circular cylinder portion which covers an outer peripheral surface of the magnet; a turned-back portion which is arranged in one end portion of the circular cylinder portion and is in contact with one end surface of the rotor body portion; and a fastening end portion which is fastened to a flange portion arranged on the shaft so as to cover the other end surface of the rotor body portion. An engagement latch portion engaged with the rotor is arranged on the turned-back portion.

A method for manufacturing electric motor of the present invention is a method for manufacturing an electric motor which includes: a stator which is housed in a motor case, and a rotor which includes a shaft being rotatably supported by the motor case and a rotor body portion having a magnet disposed inside the stator. The method for manufacturing electric motor includes: a working process in which a press working is performed on a magnet cover having a circular cylinder portion, a turned-back portion that is integrally arranged in one end portion of the circular cylinder portion and protrudes inward in a radial direction, and an engagement latch portion that is integrally arranged on the turned-back portion; an assembly process in which the rotor which includes the rotor body portion having the magnet and the shaft is assembled; and an insertion process in which the rotor is inserted into the magnet cover, and the engagement latch portion is engaged with the rotor to prevent rotation of the magnet cover with respect to the rotor.

[Effect]

The magnet cover has the turned-back portion which is in contact with the one end surface of the rotor body portion, and the fastening end portion which is fastened to the flange portion arranged on the shaft so as to cover the other end surface. The engagement latch portion engaged with the rotor is arranged on the turned-back portion. Because the engagement latch portion is engaged with the rotor, even if the circular cylinder portion of the magnet cover is loosely inserted into the outer peripheral surface of the magnet, the magnet cover will not deviate in a rotational direction with respect to the magnet. Thus, the magnet is not required to be press-fitted into the magnet cover, the circular cylinder portion of the magnet cover is not required to be firmly fastened to the outer peripheral surface of the magnet, the generation of the damage to the magnet can be suppressed, and an electric motor having a high-quality rotor can be manufactured at a high yield rate.

On one end portion of the magnet cover, the turned-back portion is in contact with the one end surface of the rotor body portion, and on the other end portion of the magnet cover, the fastening end portion is fastened to an edge portion, and thus no external force in an axial direction is applied to the magnet. Accordingly, the generation of the damage to the magnet can be suppressed.

Figure 9:
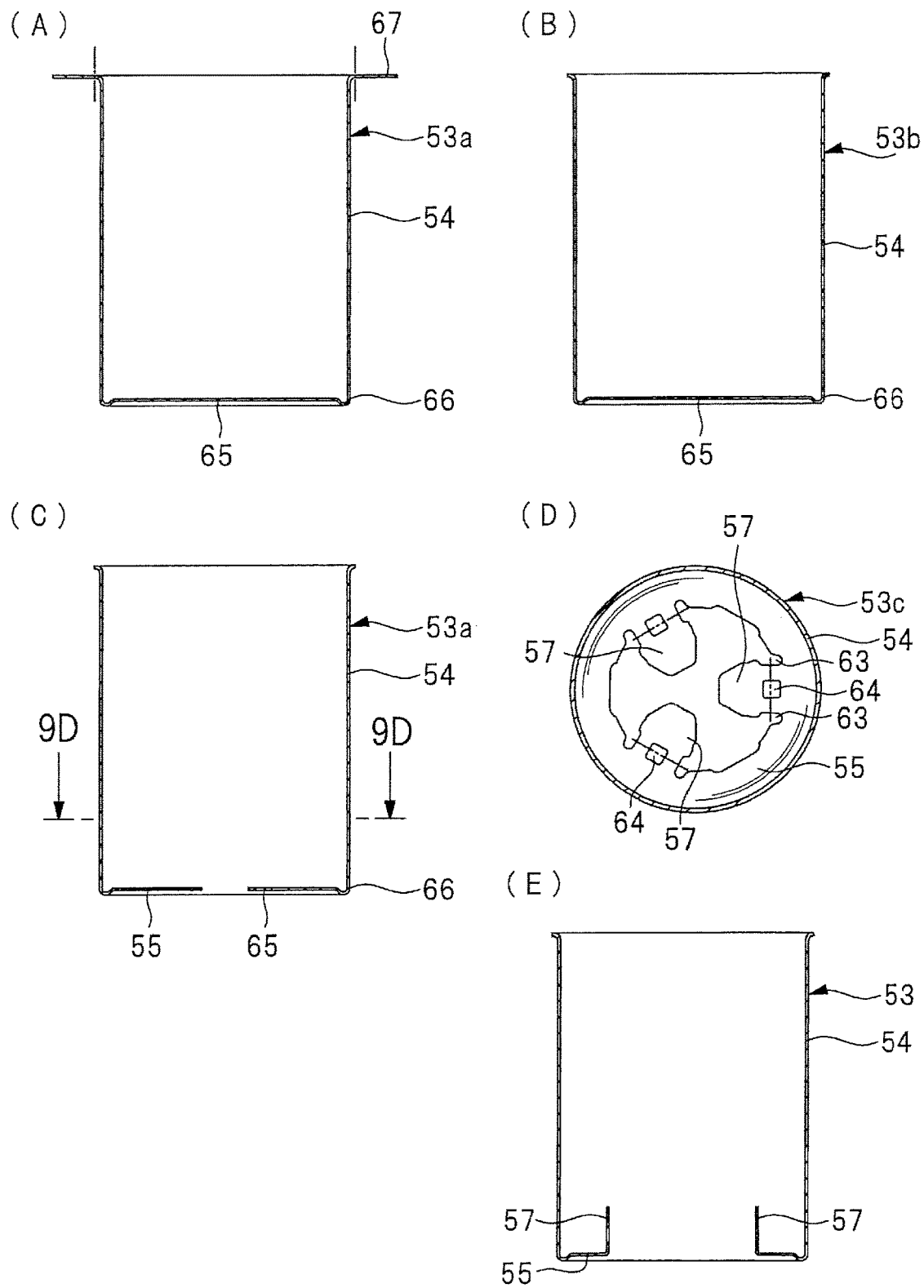

(A) to (E) of FIG. 9 are process diagrams showing a press working procedure for manufacturing the magnet cover.

Figure 10:
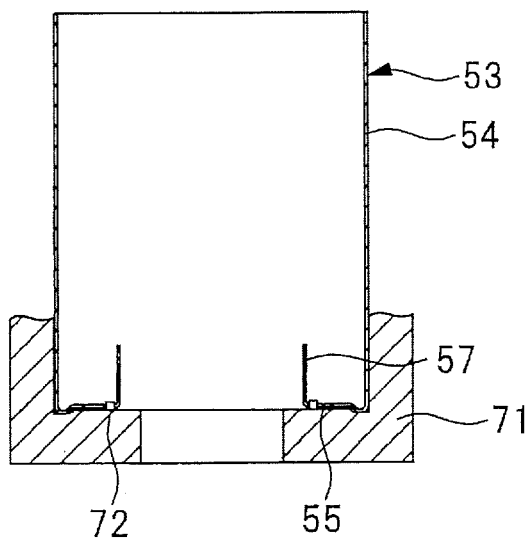
Figure 10:
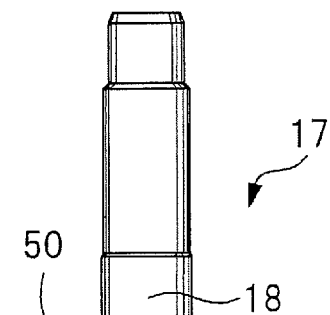
Figure 10:
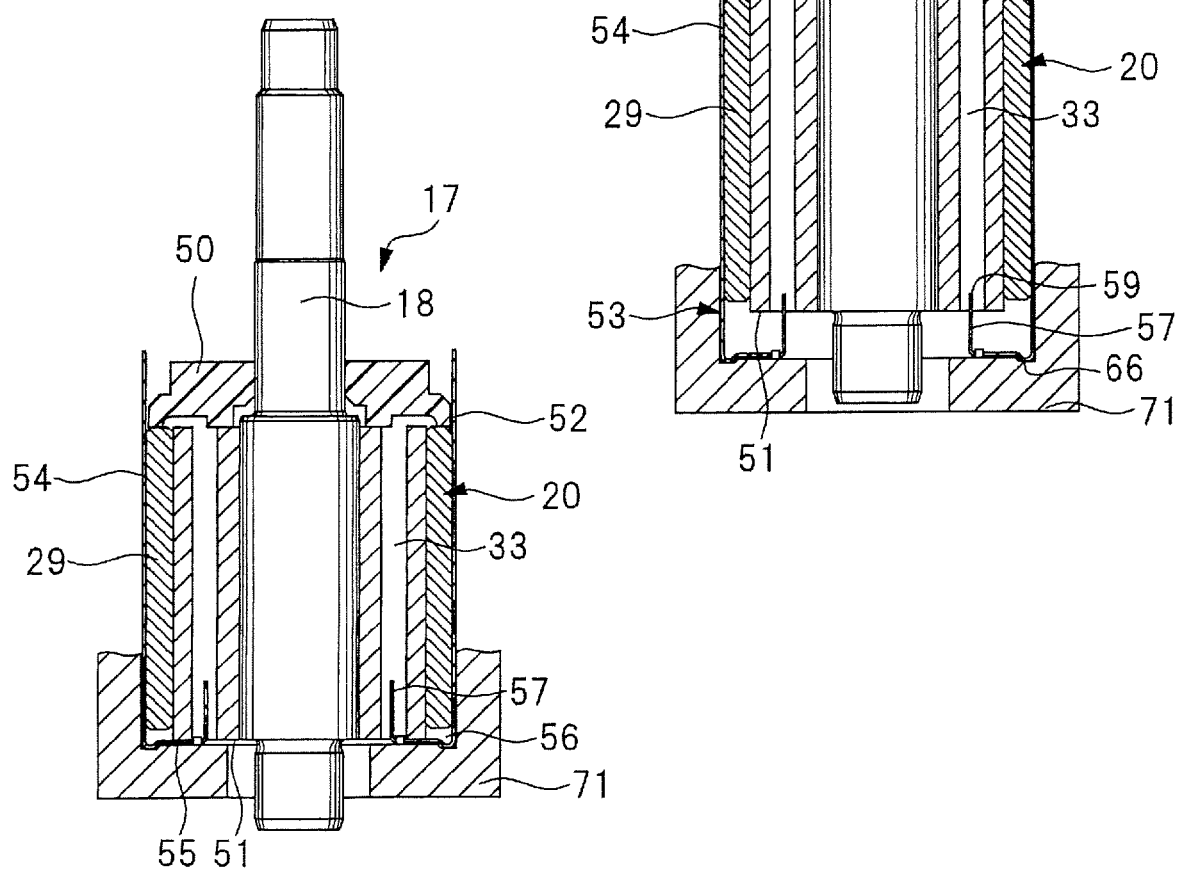

(A) to (C) of FIG. 10 are process diagrams showing an insertion procedure of the rotor to the magnet cover when the electric motor is manufactured.

Figure 11:
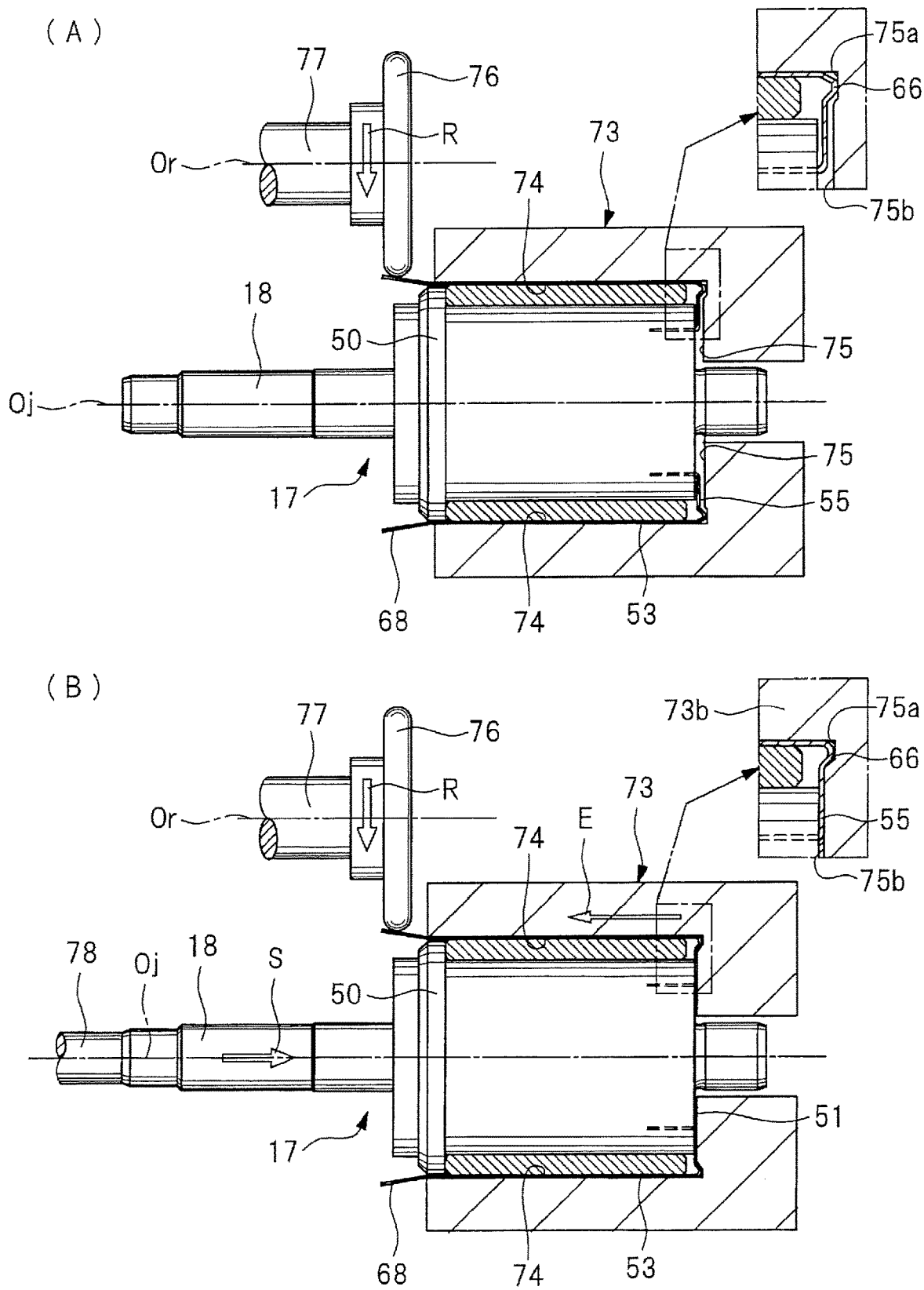

(A) and (B) of FIG. 11 are process diagrams showing a procedure for fastening an opening end portion of the magnet cover to a flange portion of a rotor body portion.

Figure 12:
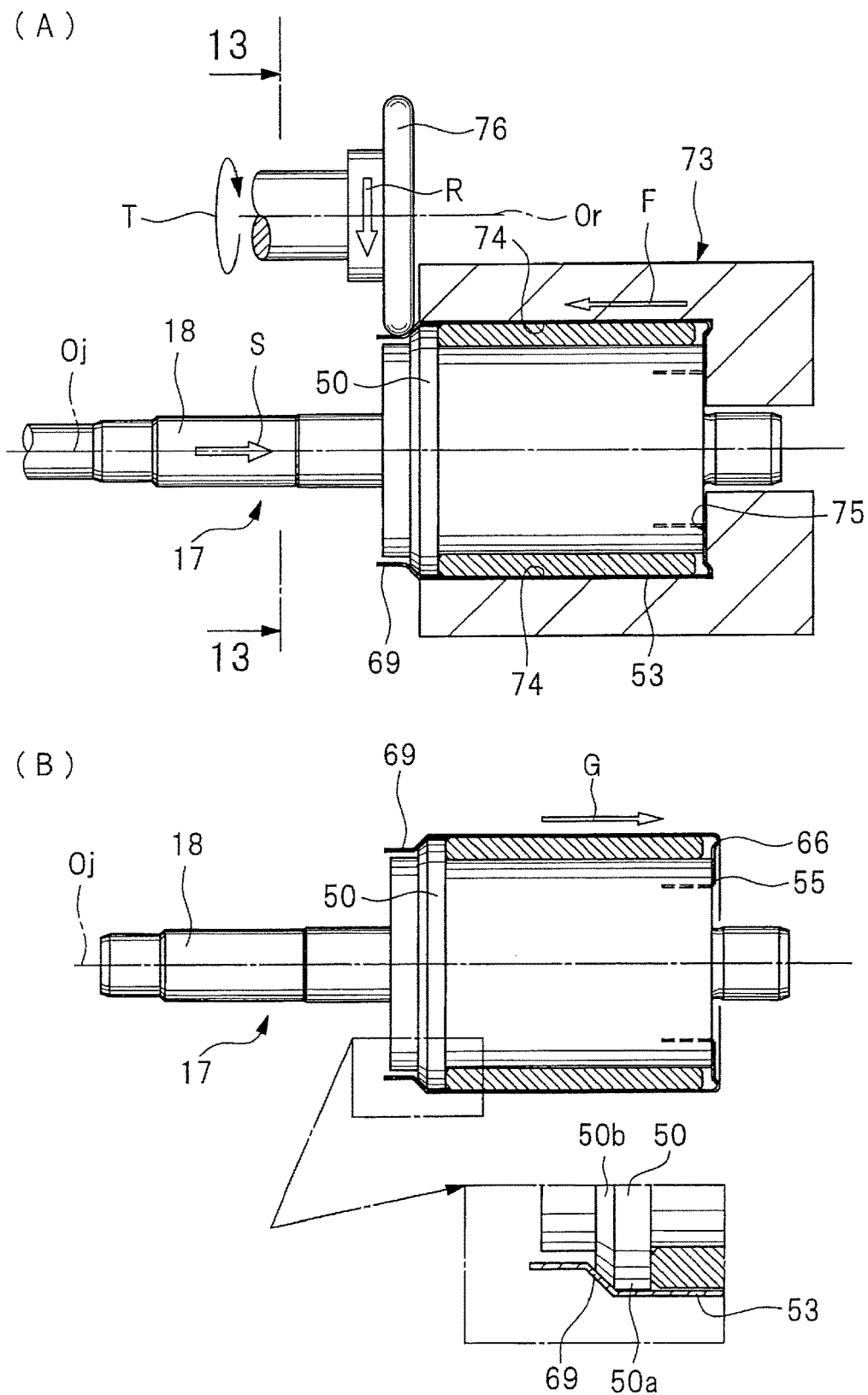

(A) and (B) of FIG. 12 are process diagrams showing a procedure for fastening the opening end portion of the magnet cover to the flange portion of the rotor body portion.

Figure 13:
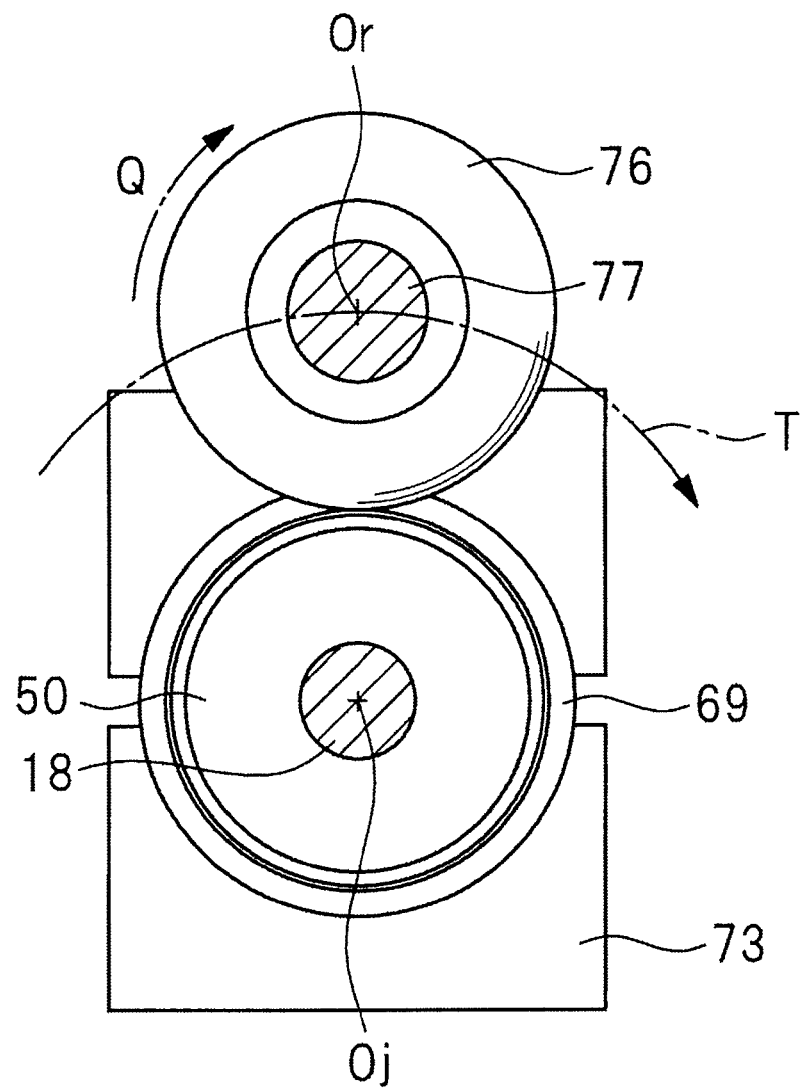

FIG. 13 is a cross-sectional view taken along a 13-13 line in (A) of FIG. 12.

Figure 14:
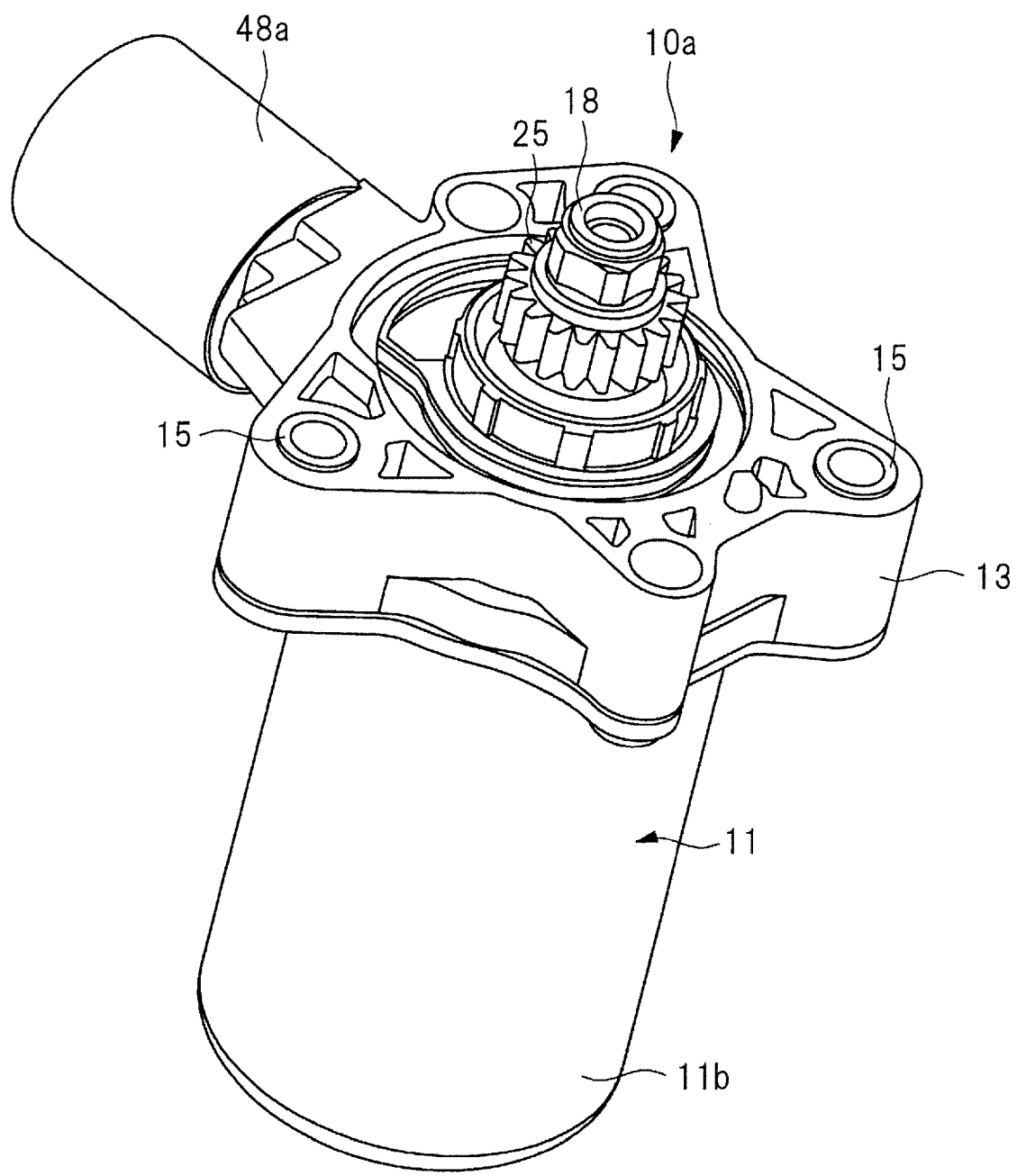

FIG. 14 is a perspective view showing an electric motor which is another embodiment.

Figure 15:
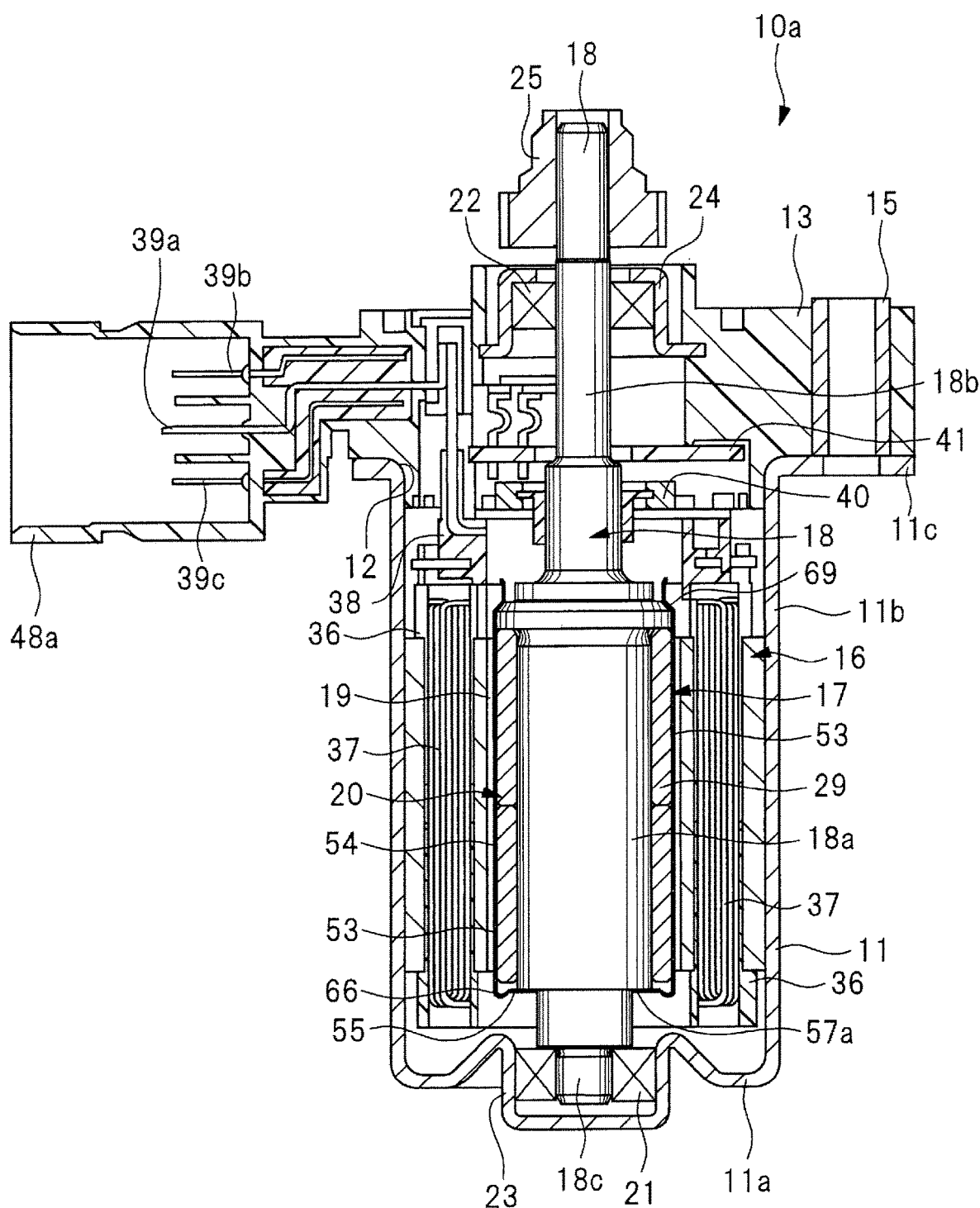

FIG. 15 is a longitudinal cross-sectional view of FIG. 14.

Figure 16:
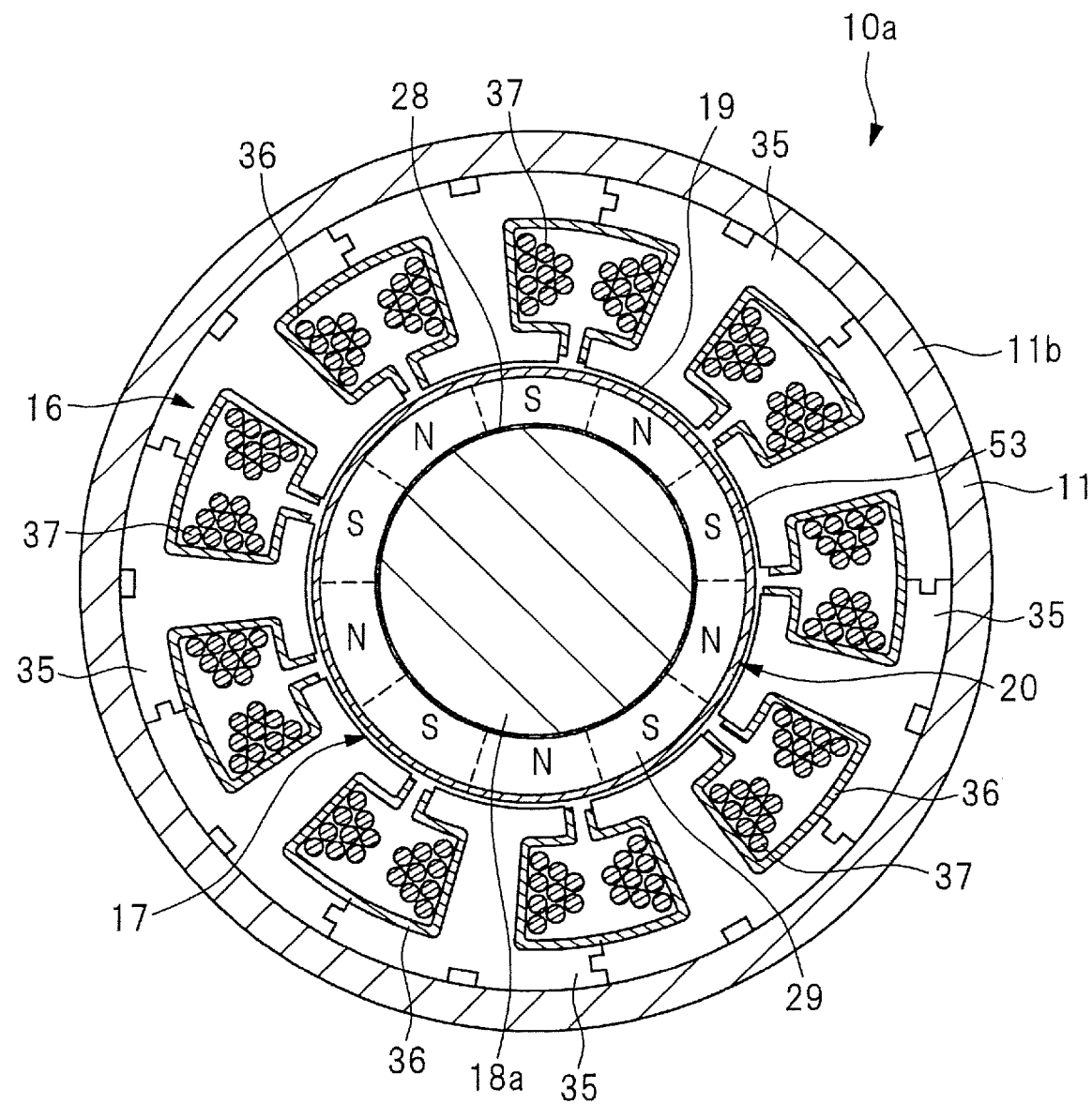

FIG. 16 is an enlarged transverse cross-sectional view of FIG. 14.

Figure 17:
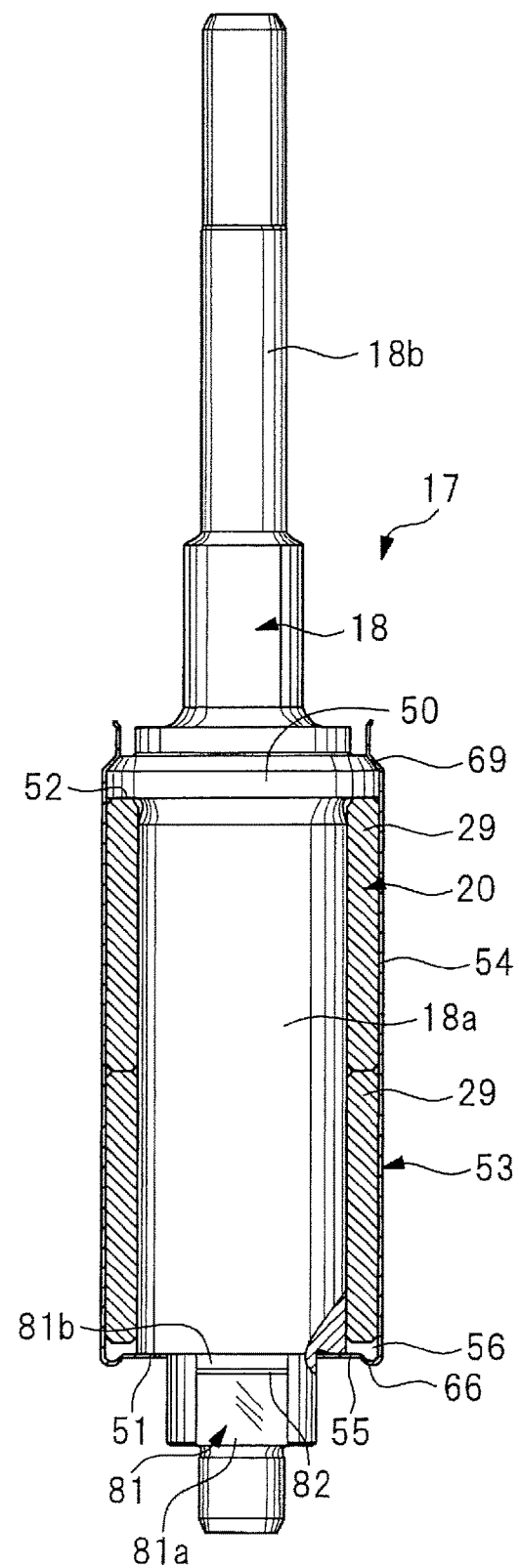

FIG. 17 is an enlarged cross-sectional view of a rotor shown in FIG. 15.

Figure 18:
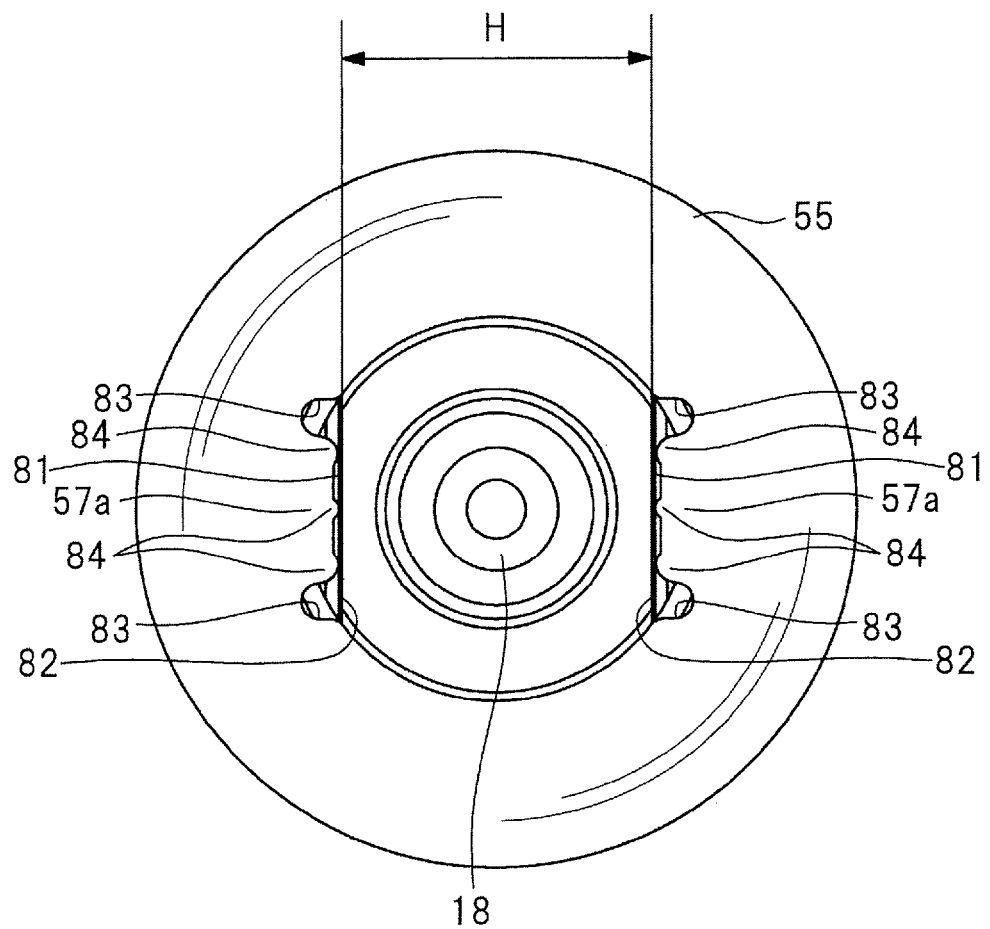

FIG. 18 is a bottom view showing a lower end surface of the rotor shown in FIG. 17.

Figure 19:
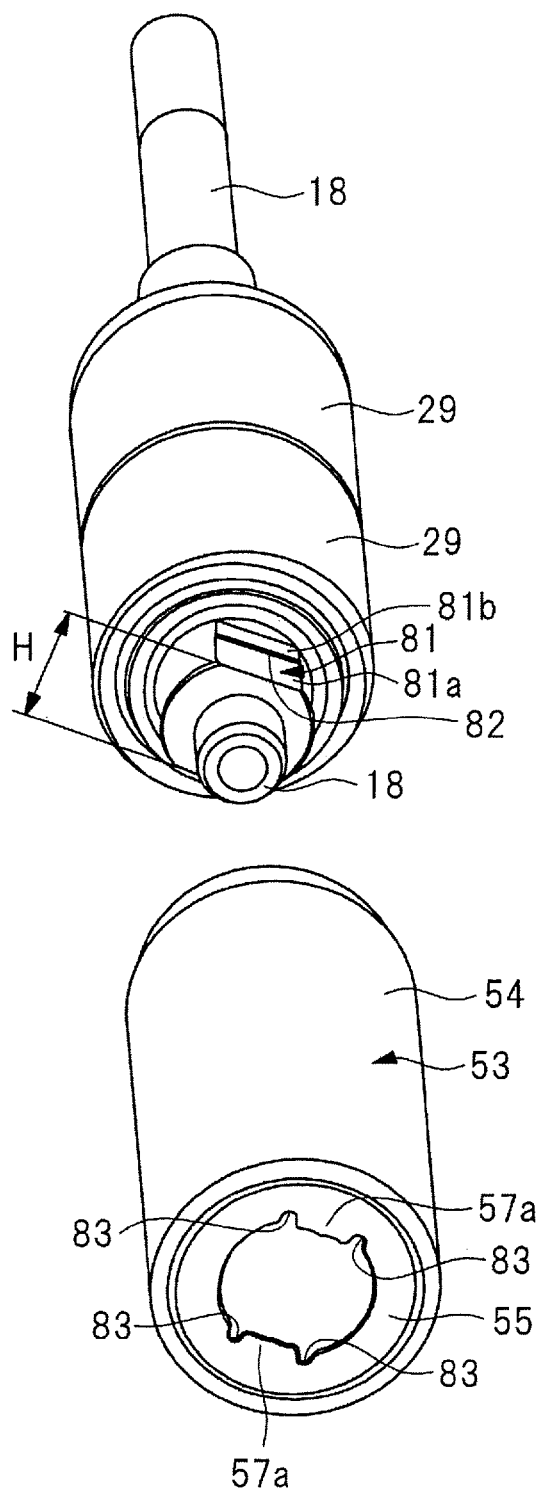

FIG. 19 is an exploded perspective view of the rotor.

Figure 20:
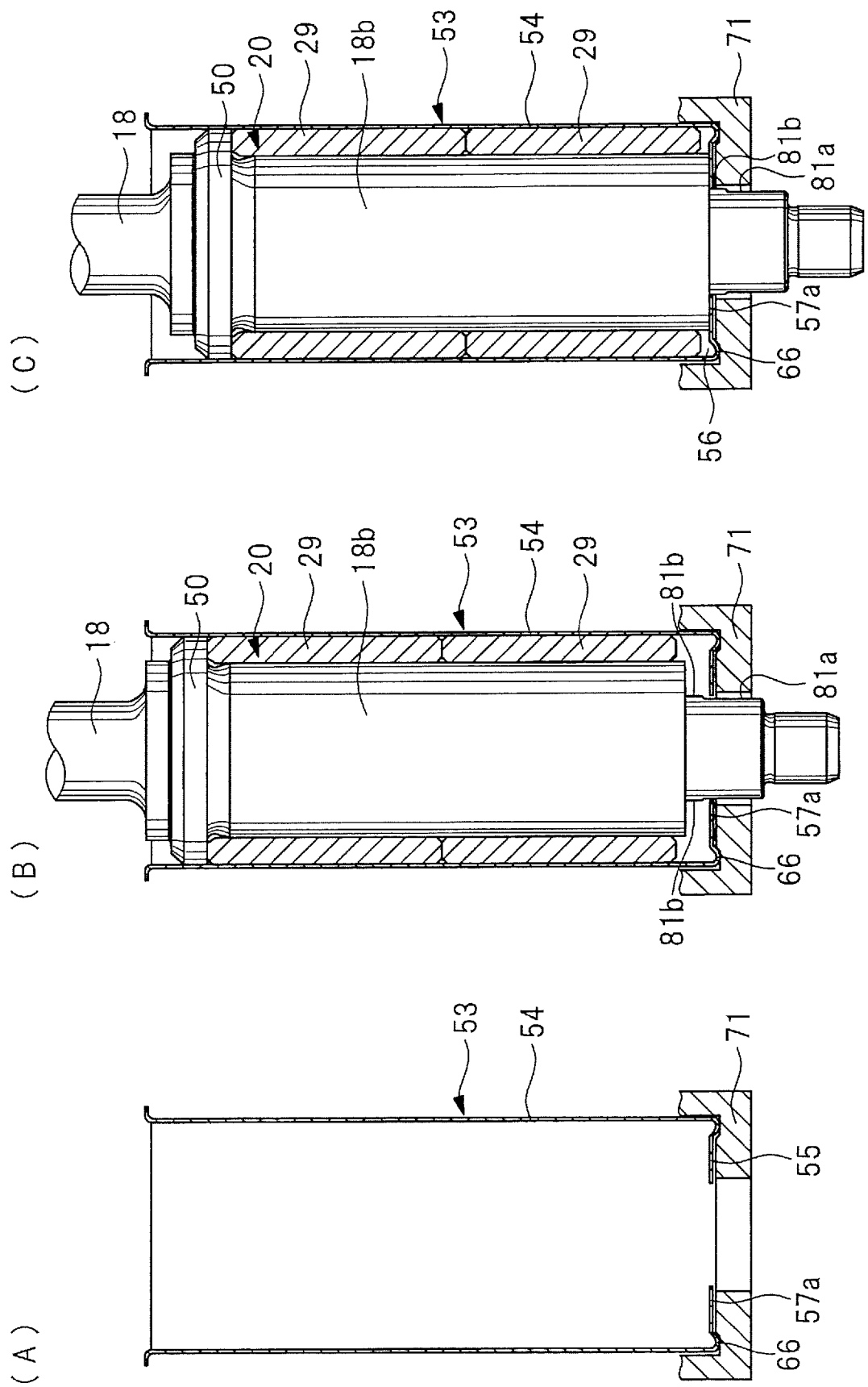

(A) to (C) of FIG. 20 are process diagrams showing an insertion procedure of the rotor to the magnet cover when the electric motor is manufactured.

DESCRIPTION OF THE EMBODIMENTS

Figure 1:
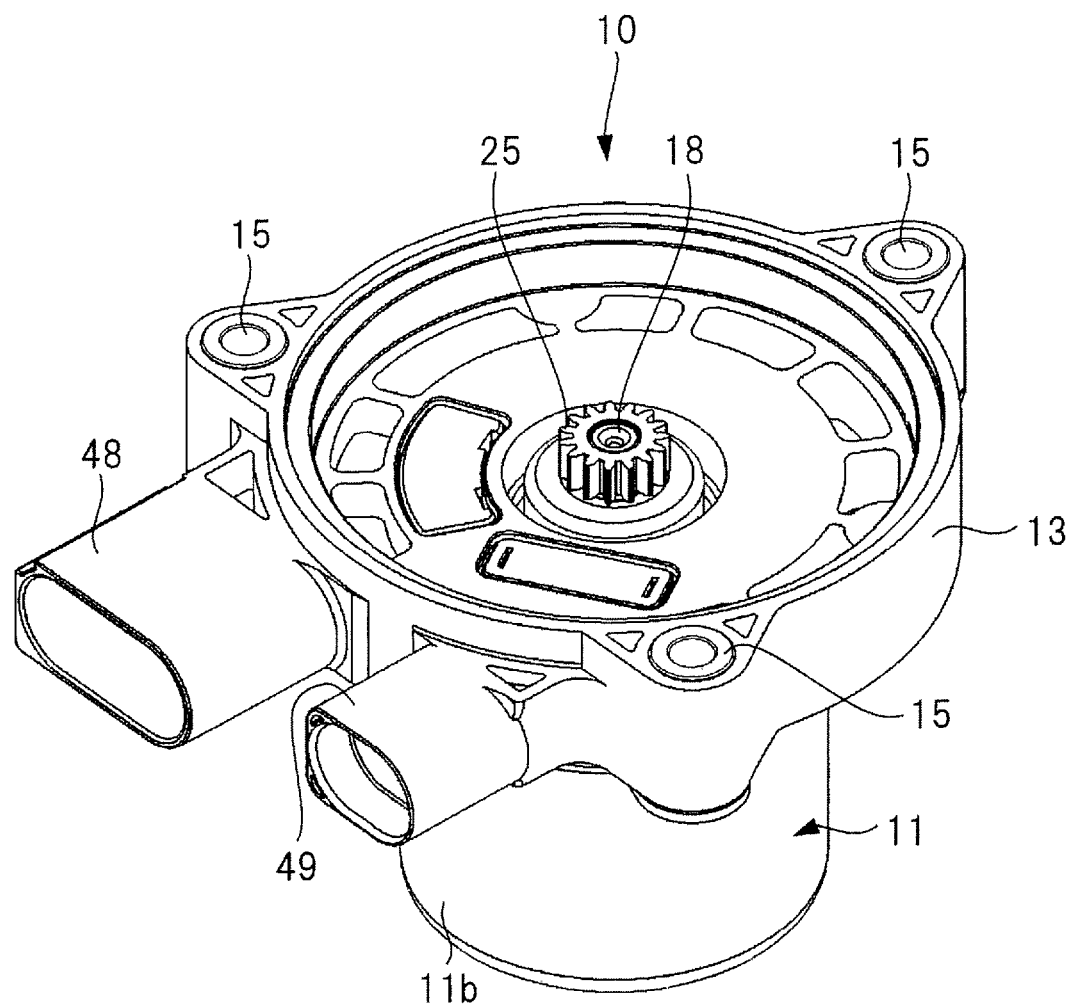
FIG. 1 is a perspective view showing an electric motor which is one embodiment.
Figure 2:
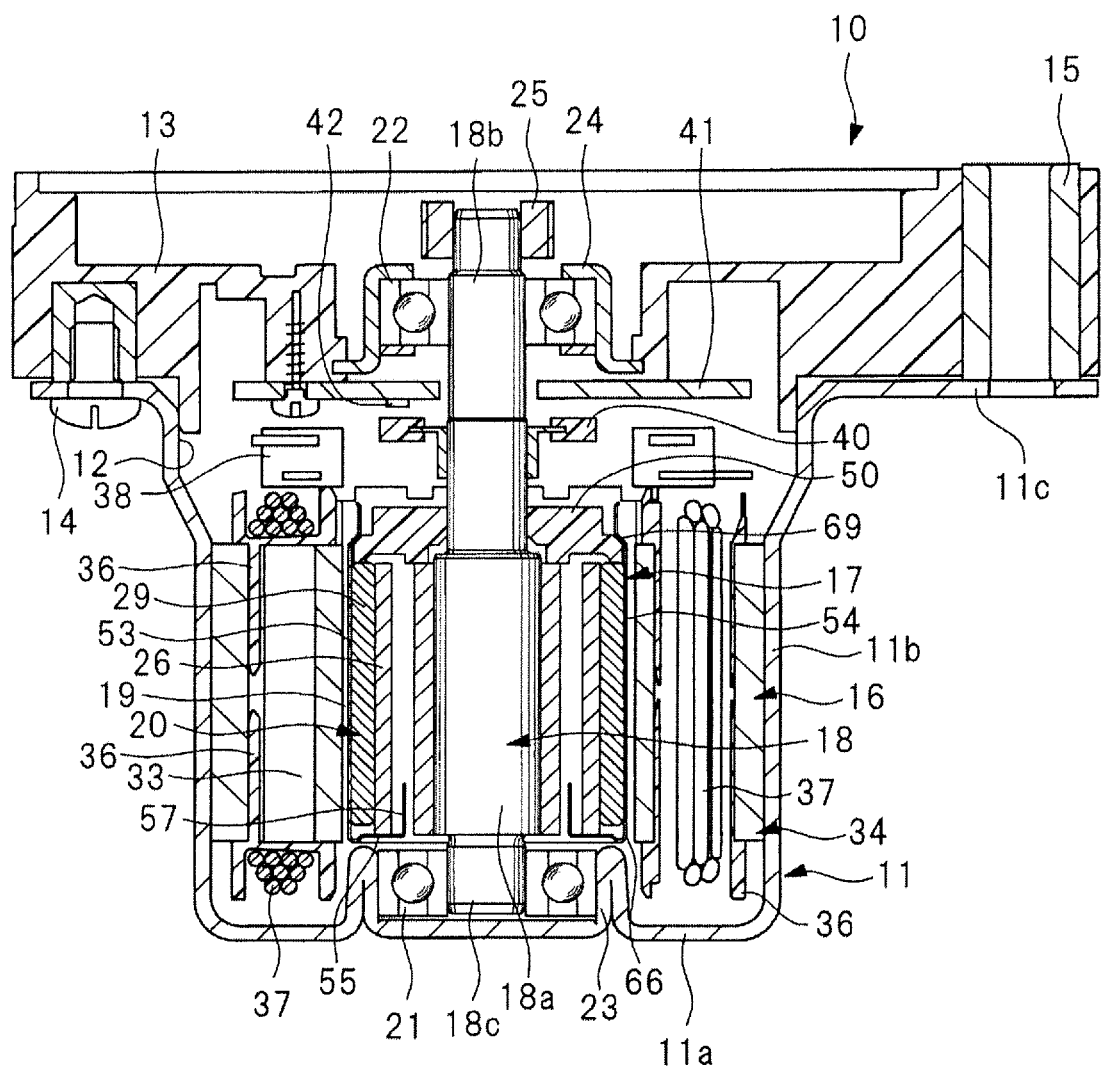
FIG. 2 is a longitudinal cross-sectional view of FIG. 1.

Hereinafter, embodiments of the present invention are described in detail with reference to the drawings. As shown in FIG. 1 and FIG. 2, an electric motor 10 includes a motor case 11. The motor case 11 is formed by performing a press working such as deep-drawing or the like on a metal plate, and as shown in FIG. 2, the motor case 11 has a bottom wall portion 11a and a circular cylinder portion 11b, and a flange portion 11c is integrally arranged in an opening end portion 12 of the circular cylinder portion 11b. A bracket 13 made of a resin material is attached to the flange portion 11c by a plurality of screw members 14.

A plurality of collars 15 are attached to the bracket 13, and the electric motor 10 is attached to a member (not shown) by the screw members penetrating each of the collars 15. This electric motor 10 can be applied to drive a brake device of an automobile, and in this case, the motor case 11 is attached to a speed reducer by the screw members penetrating the collars 15.

As shown in FIG. 2, a stator 16 is housed in the motor case 11, and the stator 16 is fixed to the circular cylinder portion 11b of the motor case 11. The electric motor 10 has a rotor 17, and the rotor 17 includes a shaft 18 which is rotatably supported by the motor case 11, and a rotor body portion 20 which is disposed inside the stator 16 via a gap 19. The shaft 18 has a magnet mounting portion 18a, and shaft portions 18b and 18c which are formed integrally in two end portions of the shaft 18, and the magnet mounting portion 18a has an outer diameter lager than that of the shaft portions 18b and 18c. The shaft portion 18c on a base end portion side of the shaft 18 is rotatably supported by the motor case 11 through a shaft bearing 21, and the shaft portion 18b on a top end portion side is rotatably supported by the bracket 13 through a shaft bearing 22. The shaft bearing 21 is mounted to a tubular portion 23 which is arranged on the bottom wall portion 11a of the motor case 11, and the shaft bearing 22 is mounted to a holder 24 which is attached to the bracket 13.

When a lower end portion of the shaft 18 in FIG. 2 is taken as the base end portion of the shaft 18, and an upper end portion is taken as the top end portion, a pinion gear 25 is attached to the top end portion. When the electric motor 10 is applied to drive the brake device, the rotation of the pinion gear 25 is transmitted to a feed screw shaft via a speed reduction gear mechanism (not shown). The feed screw shaft is screw-joined to a reciprocating member which is mounted to a caliper of the brake device in a way of reciprocating freely in an axial direction. The reciprocating member and a latch portion of the caliper facing the reciprocating member are respectively equipped with pads which are pressed against a brake disk of the electric brake device of the automobile, and a braking force is applied to the automobile by the electric motor 10.

Figure 3:
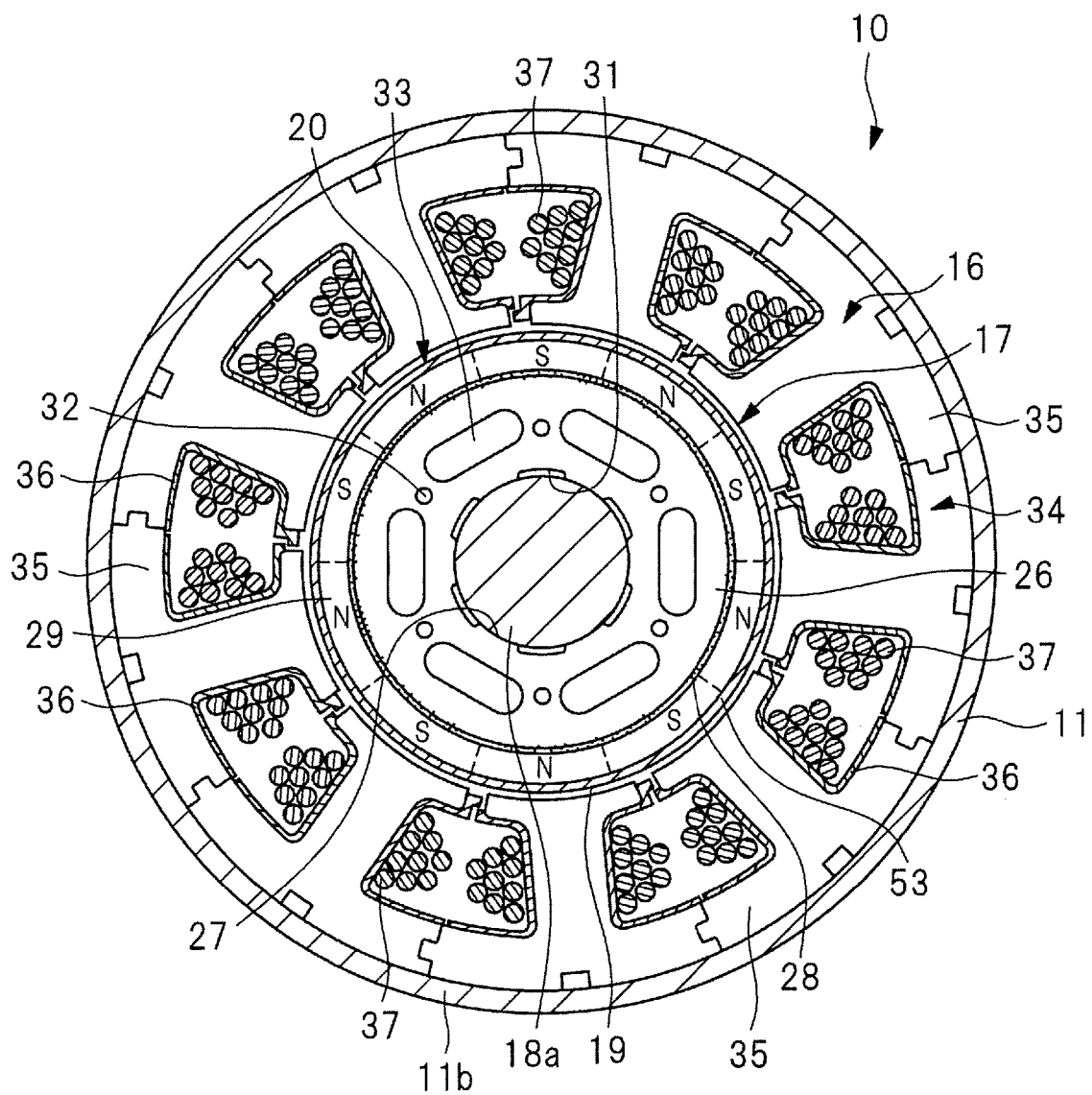
FIG. 3 is an enlarged transverse cross-sectional view of FIG. 2.

As shown in FIG. 3, the rotor body portion 20 has a rotor core 26 having a circular cylinder shape, and the shaft 18 is inserted penetratingly into an insertion hole 27 of the rotor core 26. A ring magnet 29 is fixed to the outer peripheral of the rotor core 26 by an adhesive agent 28. In the electric motor 10 shown in FIGS. 1 to 3, the ring magnet 29 is mounted to the magnet mounting portion 18a of the shaft 18 via the rotor core 26. The rotor core 26 is mounted between the magnet mounting portion 18a and the ring magnet 29. In this way, the rotor body portion 20 includes the ring magnet 29, the rotor core 26, and the magnet mounting portion 18a of the shaft 18.

A plurality of recessed grooves 31 are arranged on the insertion hole 27 in a way of extending in the axial direction. The rotor core 26 is formed by laminating a plurality of metal plates (electromagnetic steel plates) which are punched into a substantially annular shape by the press working. In each metal plate, a through hole 32 for positioning during the lamination and a long hole 33 for weight saving of the rotor core 26 are formed. As shown in FIG. 3, six long holes 33 are arranged at equal intervals in a circumferential direction of the rotor core 26. The long hole 33 has a long diameter in the circumferential direction of the rotor core 26 and extends in an axial direction of the rotor core 26 as shown in FIG. 2.

The ring magnet 29 is formed by N-poles and S-poles which are magnetic poles are shifted in the circumferential direction and are magnetized alternately in a member which has a circular cylinder shape and is made of a magnetic material. On the ring magnet 29 shown in FIG. 3, ten magnetic poles are magnetized in the circumferential direction, and the rotor body portion 20 has ten poles. In FIG. 3, boundary portions of the magnetic poles of the ring magnet 29 are indicated by dashed lines. In this way, when the magnet of the rotor body portion 20 of the electric motor 10 is a ring magnet type, different from a magnet of a surface magnet type or an embedded magnet type, the magnetic poles can be allocated equally in the circumferential direction, and the rotor 17 can be manufactured with a few assembly man-hours. The magnet of the rotor body portion 20 may be the surface magnet type described above, or may be the embedded magnet type described above. With regard to the magnet of surface magnet type, an arc-shaped magnet which is stuck to the outer peripheral surface of the circular cylinder-shaped member is considered to be detached, but the endurance of the electric motor 10 can be improved using the ring magnet type.

The stator 16 has a stator core 34 having a substantially circular cylinder shape. As shown in FIG. 3, the stator core 34 is formed by combining nine teeth portions 35 in the circumferential direction. Each of the teeth portions 35 is formed by laminating a plurality of metal plates (electromagnetic steel plates) which are punched by the press working. On each of the metal plates, a through hole (not shown) for positioning during the lamination is arranged. An insulator 36 made of an insulative resin material is mounted to each of the teeth portions 35, and a coil 37 is wound on the outer side of the insulator 36. The coil 37 is wound on the nine teeth portions 35, and the stator 16 shown in FIG. 3 has nine coils 37.

Each of the coils 37 constitutes three phases in the circumferential direction in an order of U-phase, V-phase, and W-phase, and each phase is formed by three coils 37. As shown in FIG. 2, a bus bar unit 38 is disposed on an end surface on a top end side of the stator 16. A terminal of each coil 37 and an external power supply are electrically connected by the bus bar unit 38. The electric motor 10 is a brushless motor, and a sensor disk 40 is attached to the shaft 18 in order to detect a position in a rotational direction of the rotor 17. On the sensor disk 40, a magnet (not shown) is arranged. A sensor substrate 41 is attached to the bracket 13 facing the sensor disk 40, and a hall element 42 sensitive to a magnetic force of the magnet arranged on the sensor disk 40 is arranged on the sensor substrate 41.

Figure 4:
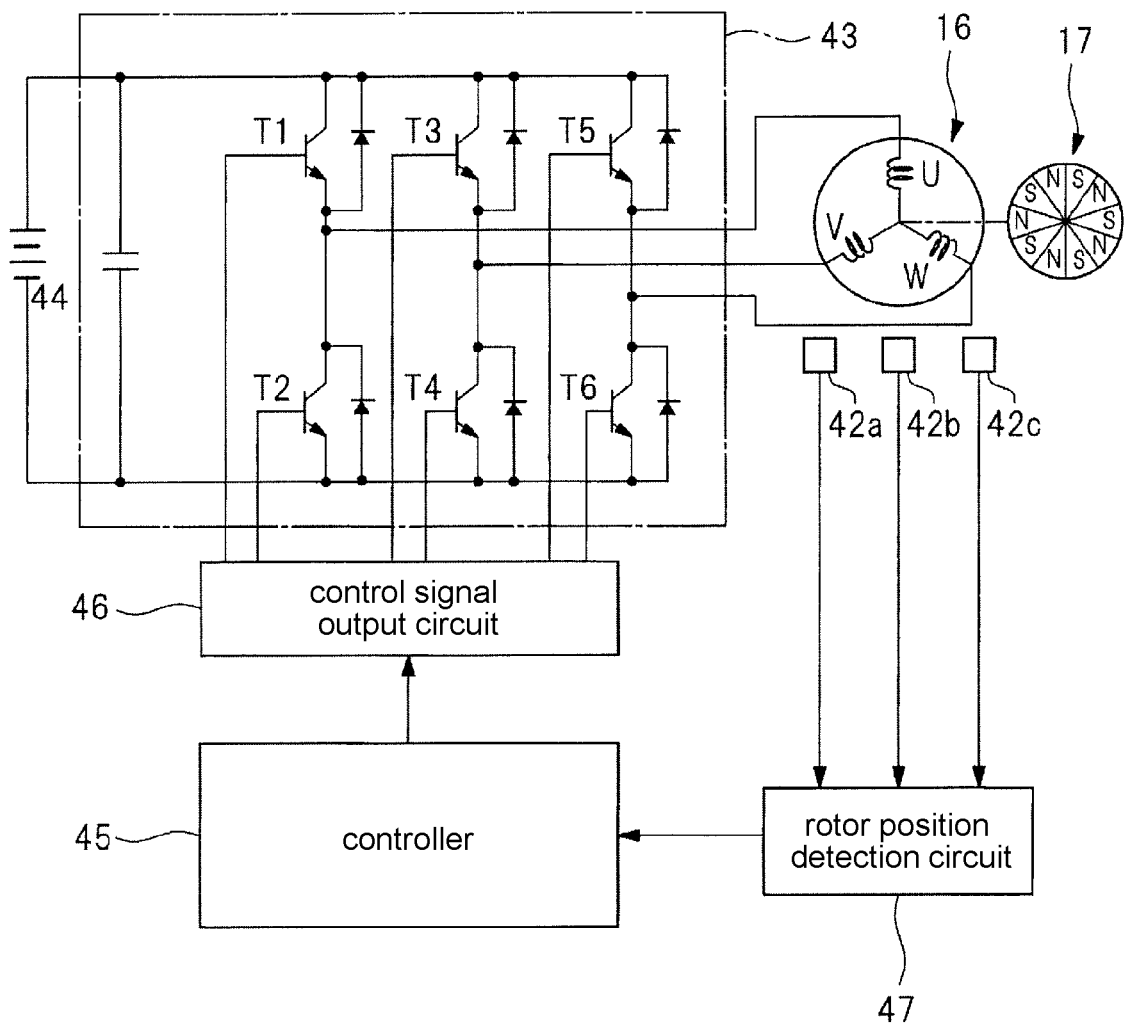
FIG. 4 is a block diagram showing a rotation control circuit of the motor.

FIG. 4 is a block diagram showing a rotation control circuit of the motor. The rotation control circuit has three hall elements 42a to 42c corresponding to the three-phase coils, and each of the hall elements is attached to the sensor substrate 41 shown in FIG. 2 as described above. On the sensor substrate 41 in FIG. 2, one hall element 42 is shown, but three hall elements 42a to 42c are arranged on the sensor substrate 41 in a way of shifting in the circumferential direction. Each of the hall elements 42a to 42c is a magnetic field detection element which outputs, by detecting a magnetic flux of the magnet arranged on the sensor disk 40, a detection signal when a polarity of the magnetic pole portion of the rotor 17 becomes a neutral point from the N-pole to the S-pole. Each of the hall elements 42a to 42c detects a position of the rotor 17 based on the detection signal from the hall element, and an energization switching operation with respect to each of the coils 37 is performed. The sensor for detecting the rotation position is not limited to the hall element, and a hall IC may be used which is obtained by incorporating an electronic element having a function of a comparator and the hall element into one chip.

The rotation control circuit of the motor has an inverter circuit 43 for controlling a drive current with respect to each coil 37 of U-phase, V-phase, and W-phase. The inverter circuit 43 is a three-phase full bridge inverter circuit and has two switching elements T1 and T2 which are connected serially, two switching elements T3 and T4 which are respectively connected serially, and two switching elements T5 and T6 which are connected serially. Each of the switching elements T1, T3, and T5 is connected to an output terminal of a positive pole of a direct-current power supply 44, and each of the switching elements T2, T4, and T6 is connected to an output terminal of a negative pole of the direct-current power supply 44. One connection terminal of the U-phase coil 37 is connected between the two switching elements T1 and T2. One connection terminal of the V-phase coil 37 is connected between the two switching elements T3 and T4. One connection terminal of the W-phase coil 37 is connected between the two switching elements T5 and T6. The other connection terminals of each of the coils 37 of U-phase, V-phase, and W-phase are connected to each other, and the coils 37 are connected in a form of star connection. Besides, the connection method may be delta connection. A commutation operation with respect to each coil 37 is controlled by adjusting a timing of a control signal supplied to each of the switching elements.

The rotation control circuit of the motor has a controller 45, and the control signal is sent from the controller 45 to the inverter circuit 43 via a control signal output circuit 46. The detection signals of the hall elements 42a to 42c used as the rotation position detection sensors are sent to a rotor position detection circuit 47. A signal is sent from the rotor position detection circuit 47 to the controller 45. The controller 45 has a microprocessor which operates the control signal, and a memory in which a control program, data, and the like are stored.

The inverter circuit 43, the controller 45, the rotor position detection circuit 47, and the like are arranged outside the motor, and as shown in FIG. 1, lead wires which connect one connection terminal of the coil of each phase to the inverter circuit 43 are guided to the outside through a cable guide 48 arranged on the bracket 13. Lead wires which connect the three hall elements 42a to 42c to the rotor position detection circuit 47 are guided to the outside through a cable guide 49 arranged on the bracket 13.

Figure 5:
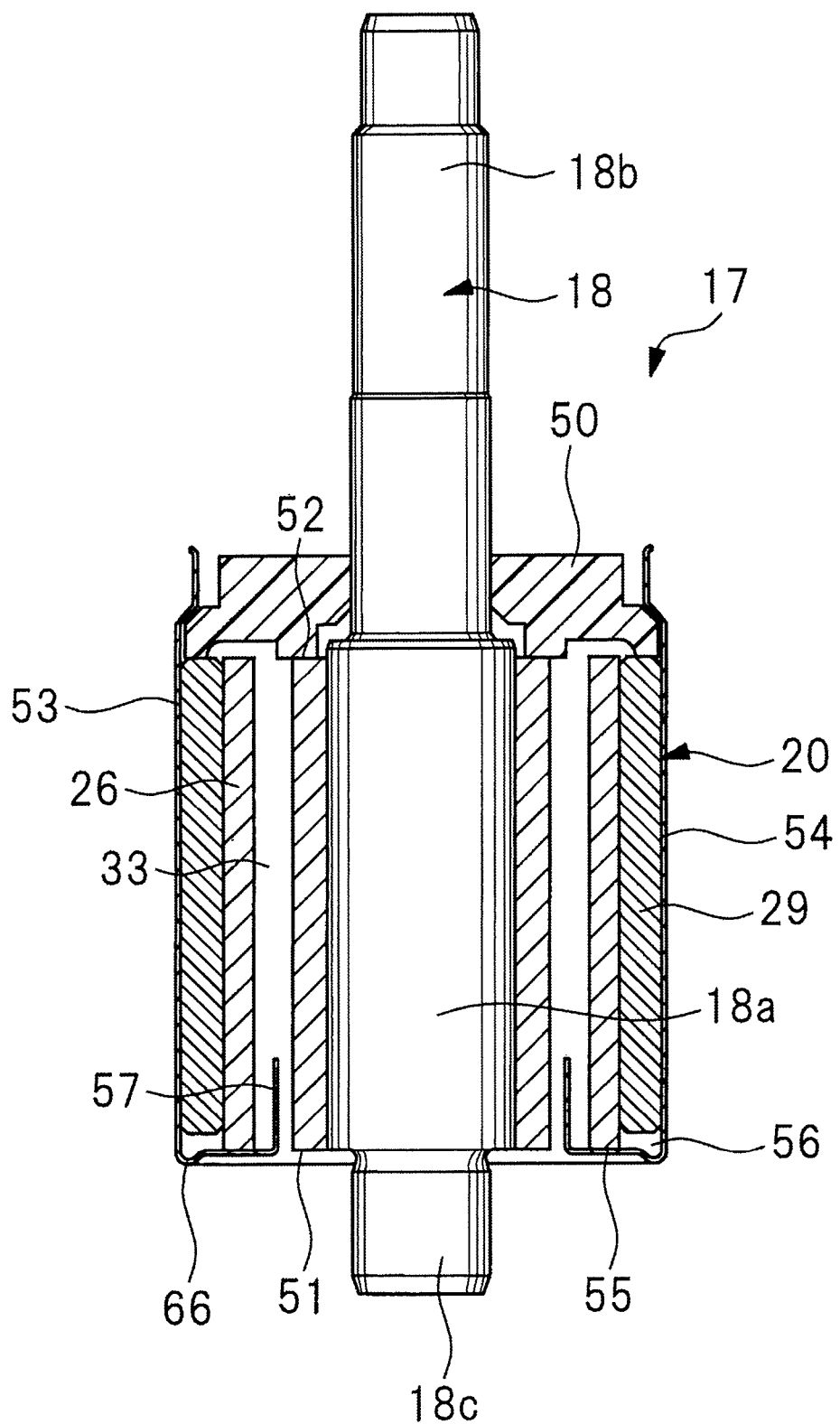
FIG. 5 is an enlarged cross-sectional view of a rotor shown in FIG. 2.
Figure 6:
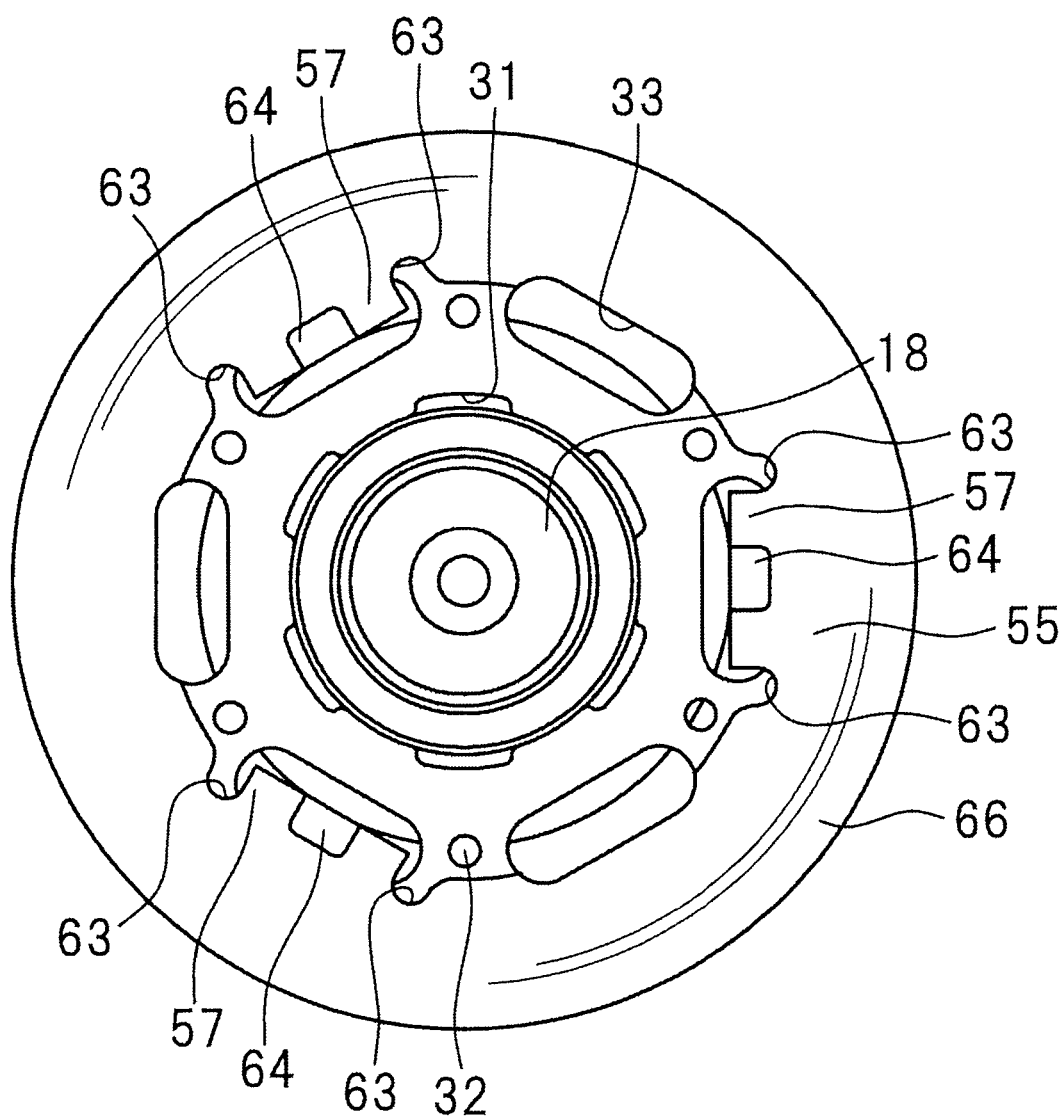
FIG. 6 is a bottom view showing a lower end surface of the rotor shown in FIG. 5.
Figure 7:
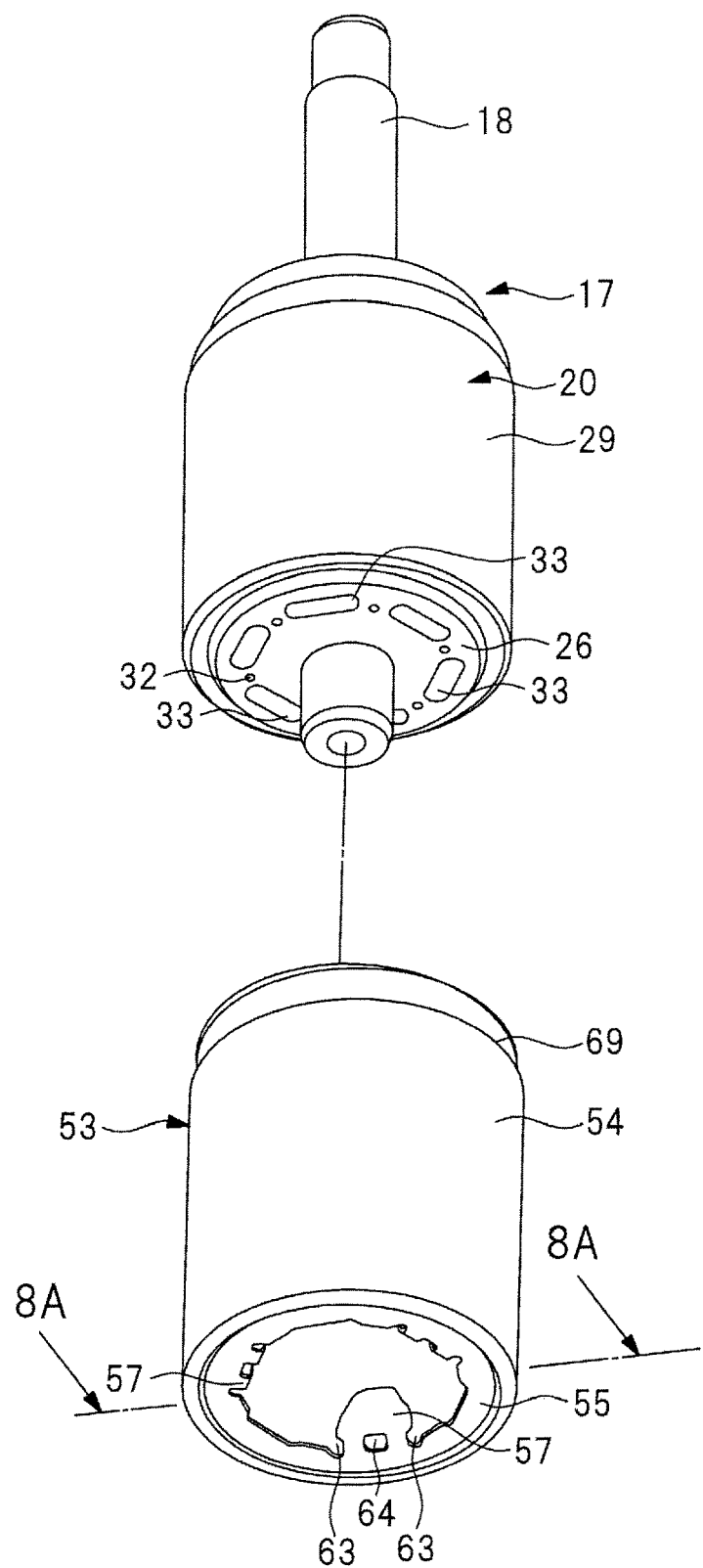
FIG. 7 is an exploded perspective view of the rotor.
Figure 8:
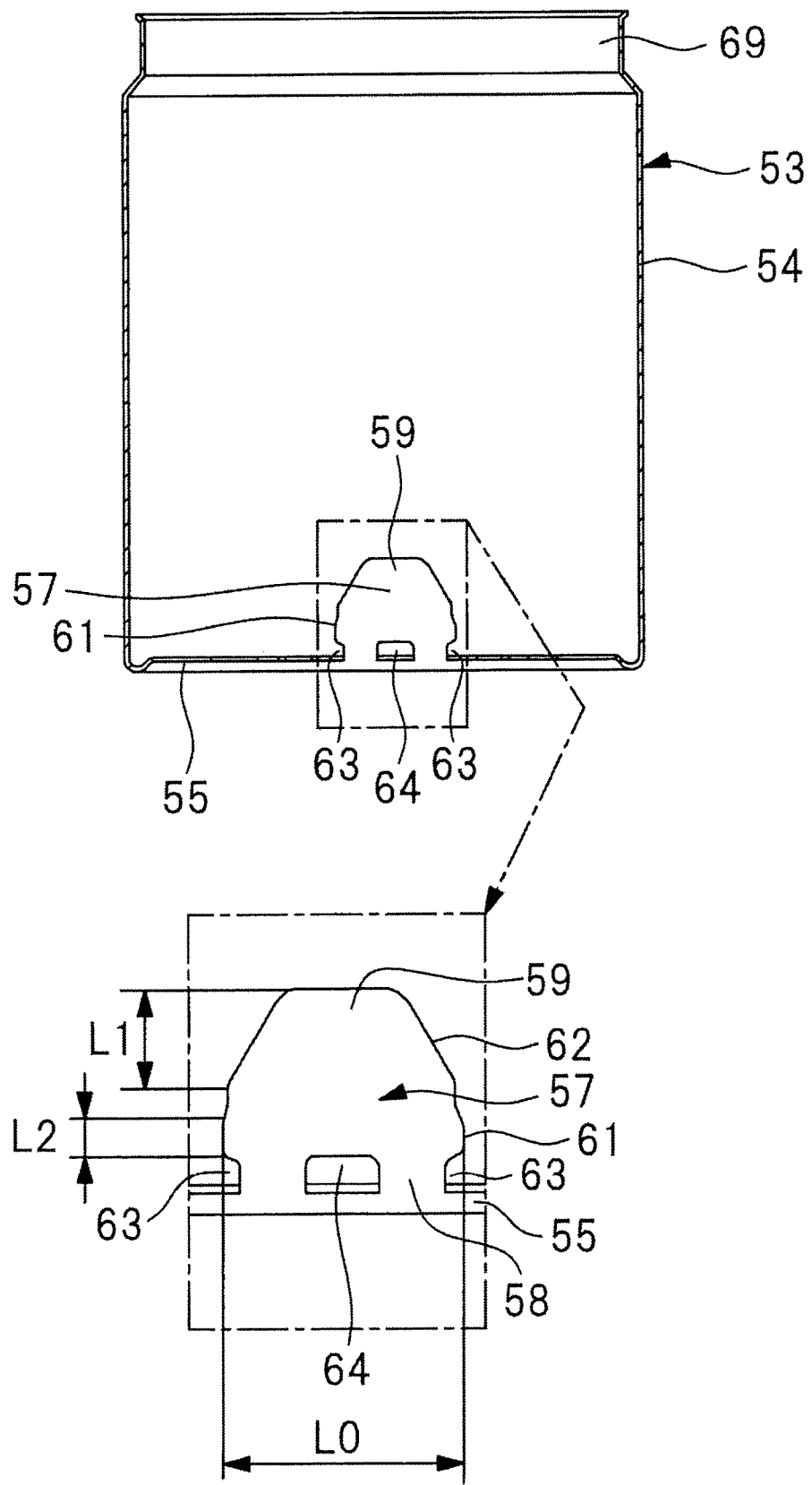
FIG. 8 is a cross-sectional view showing a magnet cover observed from a direction of an 8A-8A line in FIG. 7.

FIG. 5 is an enlarged cross-sectional view of the rotor 17 shown in FIG. 2 and FIG. 3. FIG. 6 is a bottom view showing a lower end portion of the rotor in FIG. 5, FIG. 7 is an exploded perspective view of the rotor, and FIG. 8 is a cross-sectional view showing a magnet cover observed from a direction of an 8A-8A line in FIG. 7.

The rotor body portion 20 has upper and lower end surfaces in FIG. 5, one end surface is set as a first end surface 51, and the other end surface is set as a second end surface 52. A flange portion 50 is arranged on the shaft 18, the inner surface of the flange portion 50 has a portion which is in contact with an end surface of the rotor core 26, and a portion which is in contact with an end surface of the ring magnet 29, and the flange portion 50 is in contact with the second end surface 52 of the rotor body portion 20. The ring magnet 29 is covered by a magnet cover 53. The magnet cover 53 is manufactured by stainless materials SUS304 and SUS305 which are nonmagnetic materials, and reduction in motor performance is prevented without affecting a magnetic path of the ring magnet 29.

The magnet cover 53 has a circular cylinder portion 54 which covers the outer peripheral surface of the ring magnet 29, and a turned-back portion 55 which is arranged in an annular shape on one end portion of the circular cylinder portion 54. The turned-back portion 55 is bent inward in the radial direction toward a central portion of the circular cylinder portion in the radial direction from an end portion of the circular cylinder portion 54, and is in contact with the first end surface 51 of the rotor body portion 20. The turned-back portion 55 is not in contact with the end surface of the ring magnet 29, and a gap 56 is arranged between the turned-back portion 55 and the end surface of the ring magnet 29.

On the turned-back portion 55, three engagement latch portions 57 are arranged at equal intervals in the circumferential direction. The engagement latch portion 57 is bent to a direction perpendicular to the turned-back portion 55, extends in an axial direction of the rotor body portion 20 from the turned-back portion 55, and is substantially parallel to the circular cylinder portion 54. The engagement latch portion 57 corresponds to the position of the long hole 33, and if the magnet cover 53 is inserted into the outer side of the ring magnet 29, the engagement latch portion 57 enters the inside of the long hole 33 to be engaged with the inner surface in the circumferential direction of the long hole 33. An inner diameter of the circular cylinder portion 54 of the magnet cover 53 is slightly greater than the outer diameter of the ring magnet 29. Thus, the magnet cover 53 is inserted into the outer side of the ring magnet 29 by loosely sliding the circular cylinder portion 54 into the ring magnet 29, instead of applying an external force to press-fit the circular cylinder portion 54 into the ring magnet 29. In this way, the circular cylinder portion 54 of the magnet cover 53 is not press-fitted into the ring magnet 29, but the engagement latch portion 57 is engaged with the long hole 33 which is used as an engagement hole, and thereby the magnet cover 53 is prevented from deviating in a rotational direction with respect to the ring magnet 29.

As shown in FIG. 8, the engagement latch portion 57 has a base end portion 58 on the turned-back portion 55 side and a top end portion 59. A press-fitted portion 61 is arranged on the base end portion side of the engagement latch portion 57, a width dimension L0 of the press-fitted portion 61 is set to be equal to the long diameter of the long hole 33 or slightly greater than the long diameter, and if the magnet cover 53 is inserted into the ring magnet 29, the press-fitted portion 61 is closely adhered and press-fitted into the inner peripheral surface of the long hole 33. The top end portion 59 is formed in a tapered shape in which a width dimension is gradually reduced toward the top end surface. Accordingly, when the magnet cover 53 is inserted into the ring magnet 29, the top end portion 59 enters the long hole 33, a side surface of the top end portion 59 becomes a guide portion 62, and the engagement latch portion 57 is guided to the inner peripheral surface of the long hole 33 and inserted into the long hole 33. An axial length L1 of the guide portion 62 is set to be longer than a length L2 of the press-fitted portion 61 in order that the engagement latch portion 57 can enter the long hole 33 easily. The length L1 of the guide portion 62 is preferably twice or more of the length L2 of the press-fitted portion 61.

Six long holes 33 are formed, three engagement latch portions 57 are arranged, and the engagement latch portions 57 are engaged with three of the six long holes 33. In addition, when three or more engagement latch portions 57, for example, six engagement latch portions 57 are arranged, the engagement latch portions 57 are engaged with all of the long holes 33. The number of the long holes 33 which are used as the engagement holes is not limited to six either, and may be three or more. The engagement hole with which the engagement latch portion 57 is engaged is not limited to the long hole, and may be a hole having a perfect circular shape.

As shown in FIG. 8, on left and right side portions of the base end portion of the engagement latch portion 57, notch portions 63 for a bending working are arranged. Accordingly, if the notch portion 63 is arranged in the base end portion of the engagement latch portion 57, that is, a boundary portion of the engagement latch portion 57 and the turned-back portion 55, the bending working of the engagement latch portion 57 can be easily performed with high precision when the engagement latch portion 57 is bent to a direction substantially perpendicular to the turned-back portion 55. Bending workability can also be improved when the notch portion 63 is arranged on only one side instead of both left and right sides of the engagement latch portion 57.

In a center portion in a width direction of the base end portion of the engagement latch portion 57, a positioning hole 64 is arranged. This positioning hole 64 is used to mount the magnet cover 53 to a positioning pin of a jig when the rotor body portion 20 is inserted into the magnet cover 53. The positioning hole 64 is arranged between two notch portions 63 on both left and right sides, and in addition to the notch portion 63, the positioning hole 64 also has a function for facilitating the bending workability of the engagement latch portion 57.

(A) of FIG. 9 to (E) of FIG. 9 are working process diagrams showing a press working procedure for manufacturing the magnet cover 53.

(A) of FIG. 9 shows a magnet cover material 53a during a working in which deep-drawing is performed on a blank material that is the nonmagnetic material described above to form a cup-shaped cross-section. This magnet cover material 53a has the circular cylinder portion 54 and a bottom wall portion 65, and on one end of the circular cylinder portion 54, a convex portion 66 is formed which protrudes outward in an axial direction from the bottom wall portion 65. If a cutting working is performed on a flange portion 67 generated in the deep-drawing working of the magnet cover material 53a, as shown in (B) of FIG. 9, a working is performed on a magnet cover material 53b during the working which includes the circular cylinder portion 54 and the bottom wall portion 65. (C) of FIG. 9 is a longitudinal cross-sectional view showing a magnet cover material 53c which is in a state in which the bottom wall portion 65 is punched by pressing, and (D) of FIG. 9 is a cross-sectional view taken along a 9D-9D line in (C) of FIG. 9. On the bottom wall portion 65 of the magnet cover material 53c, as shown in (D) of FIG. 9, the turned-back portion 55 having the annular shape, and three engagement latch portions 57 protruding inward in the radial direction from the turned-back portion 55 are formed. Furthermore, the notch portions 63 are formed on both sides of the base end portion of the engagement latch portion 57, and the positioning hole 64 is formed in the center portion in the width direction of the engagement latch portion 57.

In this magnet cover material 53c, as shown in (D) of FIG. 9, two notch portions 63 and the positioning hole 64 are disposed in a straight line as shown by a chain double-dashed line, and if this portion is taken as a bending center and three engagement latch portions 57 are bent to a direction substantially perpendicular to the turned-back portion 55, as shown in (E) of FIG. 9, the magnet cover 53 is manufactured in which the engagement latch portion 57 is bent with respect to the turned-back portion 55. As described above, the notch portion 63 is arranged in the bent portion of the engagement latch portion 57, that is, the base end portion, and thus the bending working of the engagement latch portion 57 can be easily performed with high precision.

In this way, the magnet cover 53 is manufactured by the press working process shown in FIG. 9. The magnet cover 53 during the manufacture has the circular cylinder portion 54, the turned-back portion 55 which is arranged on one end portion of this circular cylinder portion 54, and the engagement latch portion 57, and the circular cylinder portion 54 extends straight toward the other end portion. In addition, in the outer peripheral portion of the turned-back portion 55, the convex portion 66 which protrudes outward in the axial direction is formed.

(A) of FIG. 10 to (C) of FIG. 10 are insertion process diagrams showing an insertion procedure of the rotor 17 to the magnet cover 53 when the electric motor 10 is manufactured. The rotor 17 is assembled as shown in FIG. 7 in a rotor assembly process (not shown).

As shown in (A) of FIG. 10, the magnet cover 53 is positioned and fixed on an insertion jig 71. The insertion jig 71 has a supporting hole which supports the magnet cover 53, and three positioning pins 72 are arranged in a bottom portion of the insertion jig 71. Each of the positioning pins 72 is fitted to the positioning hole 64 shown in (D) of FIG. 9. Thereby, the magnet cover 53 is positioned and fixed to the insertion jig 71. Besides, in FIG. 10, only one part of the insertion jig 71 is shown.

Next, the rotor 17 is inserted into the magnet cover 53. At this time, the rotor body portion 20 has an outer diameter slightly smaller than the inner diameter of the magnet cover 53, and the rotor body portion 20 can be inserted easily. (B) of FIG. 10 shows a state in which the top end portion 59 of the engagement latch portion 57 enters the long hole 33 which is used as the engagement hole. Because the top end portion 59 has a tapered shape, and the top end portion 59 has a width smaller than the long diameter of the long hole 33, the engagement latch portion 57 can easily enter the long hole 33 without positioning the magnet cover 53 in the rotational direction of the rotor 17 with high precision.

(C) of FIG. 10 shows a state in which the rotor 17 is inserted into the magnet cover 53 when an end surface of the turned-back portion 55 is in contact with an end surface on the lower side of the rotor body portion 20, that is, the first end surface 51. At this time, the press-fitted portion 61 which is arranged on the base end portion side of the engagement latch portion 57 is closely adhered and press-fitted into the inner peripheral surface of the long hole 33. Thereby, the magnet cover 53 is fixed to the rotor 17 by the press-fitted portion 61, and the magnet cover 53 is prevented from rotating with respect to the rotor 17. The ring magnet 29 is fixed to the rotor core 26 by the adhesive agent 28 in the assembly process of the rotor 17, one end surface of the ring magnet 29 deviates from the rotor core 26 and an end surface of the magnet mounting portion 18a, and the other end surface is assembled in contact with the flange portion 50. Thus, if the rotor body portion 20 is inserted into the magnet cover 53, the gap 56 is formed between the ring magnet 29 and the turned-back portion 55, and the turned-back portion 55 is not in contact with the end surface of the ring magnet 29.

FIGS. 11 to 13 are caulking process diagrams showing a process in which an opening end portion of the magnet cover 53 is fastened to the flange portion 50 of the rotor body portion 20.

As shown in (A) of FIG. 11, the rotor 17 inserted into the magnet cover 53 is attached to a workpiece support jig 73. Besides, on the opening portion of the magnet cover 53, as shown in FIG. 11, an enlarged diameter portion 68 is arranged which has a diameter gradually becoming greater toward the opening end surface. In this way, if the enlarged diameter portion 68 is arranged, the rotor body portion 20 can be easily inserted into the magnet cover 53. The enlarged diameter portion 68 may be worked after the magnet cover 53 has been manufactured to the shape shown in (E) of FIG. 9, or may be worked in the deep-drawing working process as shown in (A) of FIG. 9. In addition, the enlarged diameter portion 68 may not be arranged.

The workpiece support jig 73 has a supporting hole 74 which is in contact with the outer peripheral surface of the circular cylinder portion 54 of the magnet cover 53, and an abutting surface 75 in the radial direction facing the turned-back portion 55 is formed on an end portion on the bottom portion side of the supporting hole 74. If the rotor 17 is inserted into the supporting hole 74, a central axis of the rotor 17 comes into a state of being concentric with a jig center axis Oj of the workpiece support jig 73. An elastic force applying portion 75a is arranged in a portion on the outer side in the radial direction of the abutting surface 75, and the convex portion 66 of the rotor 17 is in contact with the elastic force applying portion 75a. As shown in (A) of FIG. 11, the abutting surface 75 has the elastic force applying portion 75a which the top end of the convex portion 66 is in contact with when the rotor 17 is attached to the workpiece support jig 73, and a tightening portion 75b which is closer to an inner portion in the radial direction than the elastic force applying portion 75a.

As shown in (A) of FIG. 11, in a state in which the rotor 17 is supported by the workpiece support jig 73, if an external force in the axial direction is applied to the rotor 17, the rotor 17 is supported by a force by which the rotor 17 can be moved in the axial direction.

A caulking roller 76 is disposed adjacent to the workpiece support jig 73, and the caulking roller 76 is mounted to a support shaft 77 in a way of rotating freely around a rotation center axis Or. The support shaft 77 is attached by an arm (not shown) in a way of circling and moving freely around the jig center axis Oj of the rotor 17, that is, revolving and moving freely on the outer side in the radial direction of the rotor 17, and the support shaft 77 is moved freely in the radial direction with respect to the jig center axis Oj. (A) of FIG. 11 shows a state in which as shown by an arrow R, the caulking roller 76 is brought close to the rotor 17, and the caulking roller 76 is in contact with the enlarged diameter portion 68 of the magnet cover 53.

As shown in (B) of FIG. 11, in the state in which the rotor 17 is supported by the workpiece support jig 73, as shown by an arrow S, a pressing force is applied to the rotor 17 in the axial direction toward the abutting surface 75 of the workpiece support jig 73 by a pressing member 78. If the pressing force in a direction toward the abutting surface 75 is applied to the rotor 17, as shown in (B) of FIG. 11, the convex portion 66 is contracted and deformed in the axial direction of the rotor 17 due to the elastic force applying portion 75*a*. Furthermore, the turned-back portion 55 is tightened between the first end surface 51 of the rotor body portion 20 and the tightening portion 75*b* of the workpiece support jig 73. Accordingly, a pushing force is applied in an axial direction E to the circular cylinder portion 54, and an elastic force in the axial direction is applied to the convex portion 66. The convex portion 66 is crushed in the axial direction, and an elastic force, that is, a spring force is accumulated inside the same as that in a spring member.

Next, the support shaft 77 is brought close and moved toward the jig center axis Oj as shown by the arrow R in (A) of FIG. 12, and the support shaft 77 is circled and moved, that is, revolved and moved around the jig center axis Oj as shown by an arrow T as shown in FIG. 13. Accordingly, the caulking roller 76 rotates and moves as shown by an arrow Q and caulks the opening end portion of the magnet cover 53 to the outer peripheral surface of the flange portion 50, and a fastening end portion 69 is formed in the opening end portion of the magnet cover 53. When the magnet cover 53 is caulked to the outer peripheral surface of the flange portion 50, as shown by an arrow F in (A) of FIG. 12, an elastic force in a direction extending toward the fastening end portion 69 formed in the opening end portion is applied to the circular cylinder portion 54. Thus, if the rotor 17 is removed from the workpiece support jig 73 after the fastening end portion 69 is worked, as shown by an arrow G in (B) of FIG. 12, a reaction force which pushes the fastening end portion 69 toward the flange portion 50 is generated on the circular cylinder portion 54, and due to this reaction force, a pushing force, that is, an elastic force is generated on the turned-back portion 55 in a direction toward the end surface 51 of the rotor body portion 20.

In this way, the turned-back portion 55 in one end portion of the magnet cover 53 is pushed against the end surface 51 of the rotor body portion 20 without being in contact with one end surface of the ring magnet 29. On the other hand, because the flange portion 50 is in contact with the other end surface of the ring magnet 29, and the fastening end portion 69 of the magnet cover 53 is pushed against the flange portion 50, no load in the axial direction is applied to the ring magnet 29. Accordingly, the ring magnet 29 is prevented from being damaged. Moreover, as shown in (B) of FIG. 12, the outer peripheral surface of the flange portion 50 has a straight surface 50*a* in the axial direction and a tapered surface 50*b* having a diameter gradually becoming smaller toward the outer side end surface of the flange portion 50. If the outer diameter of the straight surface 50*a* is set to be slightly smaller than the outer diameter of the ring magnet 29, no external force is applied from the magnet cover 53 to the ring magnet 29 even if the fastening end portion 69 is formed on the magnet cover 53.

As shown in FIG. 11 and FIG. 12, the support shaft 77 is revolved and moved around the jig center axis Oj, and the workpiece support jig 73 may be revolved and moved around the rotation center axis Or of the caulking roller 76 as long as the revolution movements of the rotation center axis Or and the jig center axis Oj are relative.

In this way, a method for manufacturing the electric motor 10 has, as described above, a process in which the rotor 17 is manufactured, and the electric motor 10 is manufactured through a process in which the rotor 17 is assembled to the stator 16 which is assembled to the motor case 11 and other processes. Besides, in FIG. 7 and FIG. 8, the magnet cover 53 is shown in a state in which the fastening end portion 69 is arranged.

FIG. 14 is a perspective view showing an electric motor 10*a* which is another embodiment, FIG. 15 is a longitudinal cross-sectional view of FIG. 14, and FIG. 16 is an enlarged transverse cross-sectional view of FIG. 14. In these drawings, members having a commonality with the members which configure the electric motor 10 described above are marked with the same signs.

Similar to the electric motor 10, the electric motor 10*a* can be applied to drive a brake device of an automobile. In this case, a motor case 11 is attached to a speed reducer gear mechanism (not shown) by a screw member penetrating the collar 15, and a braking force is applied to the automobile by the electric motor 10*a* in the same way as the electric motor 10.

The motor case 11 of the electric motor 10*a* has a diameter smaller than that of the motor case 11 of the electric motor 10. As shown in FIG. 16, the ring magnet 29 is directly fixed to the magnet mounting portion 18*a* of the shaft 18 by the adhesive agent 28, and the rotor body portion 20 is formed by the magnet mounting portion 18*a* and the ring magnet 29. With regard to the ring magnet 29, similar to that in the electric motor 10 described above, the number of poles is ten. Similarly, the stator core 34 also has nine teeth portions 35 on which the coil 37 is wound, and each coil 37 constitutes three phases of U-phase, V-phase, and W-phase.

As shown in FIG. 15, the sensor disk 40 on which a magnet is arranged is attached to the shaft 18, and the sensor substrate 41 is attached to the bracket 13 facing the sensor disk 40. The hall elements 42*a* to 42*c* sensitive to the magnet are arranged on the sensor substrate 41, and a commutation operation with respect to each coil 37 is controlled by a rotation control circuit having the inverter circuit 43 in the same way as the rotation control circuit shown in FIG. 4. As shown in FIG. 14 and FIG. 15, one cable guide 48*a* is arranged on the bracket 13. In the cable guide 48*a*, power wirings which are connected to the coils 37, sensor wirings which are connected to the hall elements 42*a* to 42*c*, and wirings for power supply and ground which are used for supplying electric power to the elements arranged on the sensor substrate 41 and the like are arranged. In FIG. 15, a terminal 39*a* of one power wiring, a terminal 39*b* of one sensor wiring, and a terminal of the wiring for the power supply are shown.

FIG. 17 is an enlarged cross-sectional view of a rotor shown in FIG. 15, FIG. 18 is a bottom view showing a lower end surface of the rotor shown in FIG. 17, and FIG. 19 is an exploded perspective view of the rotor.

Two ring magnets 29 are adhered to the magnet mounting portion 18*a*, and the rotor body portion 20 is formed by the two ring magnets 29 and the magnet mounting portion 18*a*. The flange portion 50 is integrally arranged on the shaft 18, and the end surface of the ring magnet 29 is in contact with the flange portion 50. The first end surface 51 of the rotor body portion 20 is formed by the end surface of the magnet mounting portion 18*a*, and the second end surface 52 is formed by the end surface of the ring magnet 29. Besides, one ring magnet 29 having a length of two ring magnets 29 may be fixed to the magnet mounting portion 18*a*, or may be used as a member separated from the flange portion 50 and the shaft 18 in the same way as the flange portion 50 of the electric motor 10 described above.

As shown in FIG. 17, the magnet cover 53 has the circular cylinder portion 54 which covers the outer peripheral surface of the ring magnet 29, the turned-back portion 55 which covers the first end surface 51 of the rotor body portion 20, and the fastening end portion 69 which is fastened to the flange portion 50. As shown in FIG. 18, in the turned-back portion 55, two engagement latch portions 57a are arranged facing each other at positions which are deviated by 180° in the circumferential direction. Each of the engagement latch portions 57a extends inward in the radial direction from the turned-back portion 55 and is engaged with the outer peripheral surface of the shaft 18 which configures the rotor 17. The engagement latch portion 57a is engaged with the outer peripheral surface of the shaft 18, and thereby the magnet cover 53 is prevented from rotating in the circumferential direction with respect to the ring magnet 29.

On the outer peripheral surface of the shaft 18, two flat surfaces 81 are formed corresponding to the engagement latch portions 57a. The two flat surfaces 81 are parallel to each other and are also referred to as two-way taking surfaces. As shown in FIG. 17 and FIG. 19, the two flat surfaces 81 which are two-way taking surfaces have a guide surface 81a having a width dimension H on an end surface side of the shaft 18, and an engagement surface 81b on the rotor body portion 20 side having a width dimension that is set to be greater than the width dimension H, and a step portion 82 is arranged between the guide surface 81a and the engagement surface 81b. The guide surface 81a and the engagement surface 81b are connected in the axial direction via the step portion 82.

On the other hand, as shown in FIG. 18, a top end surface of the engagement latch portion 57a extends along a width direction of the flat surface 81, and notch portions 83 are arranged on both sides of the engagement latch portion 57a. Due to the arrangement of the notch portions 83, a top end portion of the engagement latch portion 57a elastically deforms in the axial direction. On the top end portion of the engagement latch portion 57a, three protrusions 84 are arranged.

An interval between a protrusion 84 of one engagement latch portion 57a and a protrusion 84 of the other engagement latch portion 57a is set to be greater than the width dimension H of the guide surface 81a, that is, a thickness dimension, and is set to be smaller than the width dimension of the engagement surface 81b. Accordingly, when the magnet cover 53 is inserted into the outer side of the ring magnet 29, the protrusion 84 of the engagement latch portion 57a is in light contact with the guide surface 81a, and the insertion operation of the magnet cover 53 is guided. If the protrusion 84 of the engagement latch portion 57a is inserted to the position of the engagement surface 81b beyond the step portion 82 by the insertion operation, the protrusion 84 is engaged with the engagement surface 81b. The protrusion 84 slightly elastically deforms in the axial direction by an engaging force. In this way, the protrusion 84 on the top end of the engagement latch portion 57a comes into a state of being engaged with and being pushed against the engagement surface 81b, and thereby the magnet cover 53 is reliably prevented from deviating in the rotational direction with respect to the ring magnet 29.

(A) to (C) of FIG. 20 are process diagrams showing an insertion procedure of the rotor 17 to the magnet cover 53 when the electric motor 10a is manufactured. The rotor 17 is assembled as shown in FIG. 19 in a rotor assembly process (not shown).

As shown in (A) of FIG. 20, the magnet cover 53 is disposed on the insertion jig 71. Next, as shown in (B) of FIG. 20, the rotor 17 is inserted from the opening end portion of the magnet cover 53. At this time, the rotor body portion 20 has an outer diameter slightly smaller than the inner diameter of the magnet cover 53, and the rotor body portion 20 can be inserted easily. (B) of FIG. 20 shows a state in which the rotor 17 is inserted into the magnet cover 53 until the protrusion 84 on the top end of the engagement latch portion 57a reaches the position of the guide surface 81a of the flat surface 81. At this time, there is a gap between the protrusion 84 and the flat surface 81, and the rotor 17 can be easily inserted into the magnet cover 53 by using the flat surface 81 as the position of the engagement latch portion 57a.

(C) of FIG. 20 shows a state in which the rotor 17 is inserted into the magnet cover 53 until the end surface 51 of the rotor body portion 20 is in contact with the turned-back portion 55. At this time, the protrusion 84 arranged on the top end of the engagement latch portion 57a is closely adhered and press-fitted into the engagement surface 81b of the flat surface 81. Accordingly, the magnet cover 53 is fixed to the rotor 17 by the engagement surface 81b, and the magnet cover 53 is prevented from rotating with respect to the rotor 17.

The ring magnet 29 is fixed to the magnet mounting portion 18a by the adhesive agent 28 in the assembly process of the rotor 17, one end surface of the ring magnet 29 deviates from the end surface 51 of the magnet mounting portion 18a, and the other end surface is assembled in contact with the flange portion 50. Thus, if the rotor body portion 20 is inserted into the magnet cover 53, the gap 56 is formed between the ring magnet 29 and the turned-back portion 55, and the turned-back portion 55 is not in contact with the end surface of the ring magnet 29.

In this way, similar to the case in which the rotor 17 shown in FIGS. 1 to 3 is manufactured, the rotor 17 which is inserted into the magnet cover 53 is transported to a workpiece support jig similar to the workpiece support jig 73 which is shown in FIG. 11 and used for the caulking working. Accordingly, by a process similar to the caulking process shown in FIG. 11 and FIG. 12, the opening end portion of the magnet cover 53 is fastened to the flange portion 50 of the rotor body portion, and the fastening end portion 69 is worked in the end portion of the magnet cover 53.

The present invention is not limited to the embodiments described above, and various changes may be made without departing from the scope of the present invention.

What is claimed is:

1. An electric motor comprising: a stator which is housed in a motor case, and a rotor which comprises a shaft being rotatably supported by the motor case and a rotor body portion having a magnet disposed inside the stator, wherein
the electric motor has a magnet cover comprising: a circular cylinder portion which covers an outer peripheral surface of the magnet; a turned-back portion which is arranged in one end portion of the circular cylinder portion and is in contact with one end surface of the rotor body portion; and a fastening end portion which is fastened to a flange portion arranged on the shaft so as to cover the other end surface of the rotor body portion;
an engagement latch portion engaged with the rotor is arranged on the turned-back portion; and
an inner diameter of the circular cylinder portion is greater than an outer diameter of the magnet, wherein the electric motor has a rotor core in which an engagement hole extending in an axial direction is arranged and which is mounted between a magnet mounting portion of the shaft and the magnet, and the engagement latch portion extends in the axial direction from the turned-back portion and is engaged with an inner surface in a circumferential direction of the engagement hole, wherein a press-fitted portion which is press-fitted into an inner peripheral surface of the engagement hole is arranged in a base end portion of the engagement latch portion; and a guide portion is arranged in a top end portion of the engagement latch portion, wherein the guide portion has a width in the circumferential direction smaller than that of the press-fitted portion, and guides the engagement latch portion when the engagement latch portion is inserted into the engagement hole.

2. The electric motor according to claim 1, wherein three or more engagement holes and three or more engagement latch portions are respectively arranged at equal intervals in the circumferential direction.

3. The electric motor according to claim 1, wherein an length of the guide portion in the axial direction is twice or more of a length of the press-fitted portion.

4. The electric motor according to claim 1, wherein a notch portion for bending is arranged on a side of a base end portion of the engagement latch portion.

5. The electric motor according to claim 1, wherein a positioning hole is arranged in a center portion in a width direction of the engagement latch portion.

6. The electric motor according to claim 1, wherein the magnet is a ring magnet.

7. The electric motor according to claim 1, wherein the electric motor is used for driving an electric brake of an automobile.

8. The electric motor according to claim 1, wherein a gap is arranged between the turned-back portion and the magnet.

9. An electric motor comprising: a stator which is housed in a motor case, and a rotor which comprises a shaft being rotatably supported by the motor case and a rotor body portion having a magnet disposed inside the stator, wherein
the electric motor has a magnet cover comprising: a circular cylinder portion which covers an outer peripheral surface of the magnet; a turned-back portion which is arranged in one end portion of the circular cylinder portion and is in contact with one end surface of the rotor body portion; and a fastening end portion which is fastened to a flange portion arranged on the shaft so as to cover the other end surface of the rotor body portion; and
an engagement latch portion engaged with the rotor is arranged on the turned-back portion, wherein
the engagement latch portion extends inward in a radial direction from the turned-back portion,
two engagement surfaces being flat surfaces are formed in parallel to each other and being flat on the outer peripheral surface of the rotor, and
the engagement latch portion has top end surfaces extending along a width direction on the engagement surfaces and being parallel to each other to engage with the engagement surfaces,
when a guide surface is arranged closer to one end surface side of the rotor body portion than the engagement surface, and when the engagement latch portion is moved toward the engagement surface, the guide surface guides the engagement latch portion,
wherein a plurality of protrusions are arranged on a top end of the engagement latch portion, and the protrusions are engaged with the flat surface.

10. The electric motor according to claim 9, wherein an interval between the plurality of protrusions of two of engagement latch portions is set to be greater than a width dimension of the guide surface and is set to be smaller than a width dimension of the engagement surface, and
notch portions are arranged on both sides of the two of engagement latch portions respectively.

11. A method for manufacturing an electric motor, wherein the electric motor comprises: a stator which is housed in a motor case, and a rotor which comprises a shaft being rotatably supported by the motor case and a rotor body portion having a magnet disposed inside the stator; wherein
the method for manufacturing the electric motor comprises:
a working process in which a press working is performed on a magnet cover which has a circular cylinder portion, a turned-back portion that is integrally arranged in one end portion of the circular cylinder portion and protrudes inward in a radial direction, and an engagement latch portion that is integrally arranged on the turned-back portion;
an assembly process in which the rotor which comprises the rotor body portion having the magnet and the shaft is assembled; and
an insertion process in which the rotor is inserted into the magnet cover, and the engagement latch portion is engaged with the rotor to prevent rotation of the magnet cover with respect to the rotor, wherein
an inner diameter of the circular cylinder portion is greater than an outer diameter of the magnet, the rotor has a rotor core in which an engagement hole extending in an axial direction is arranged and which is mounted between a magnet mounting portion of the shaft and the magnet, the engagement latch portion extends in the axial direction from the turned-back portion, and
in the insertion process, the engagement latch portion is engaged with an inner surface in a circumferential direction of the engagement hole,
wherein a press-fitted portion which is press-fitted into an inner peripheral surface of the engagement hole is arranged in a base end portion of the engagement latch portion; and a guide portion is arranged in a top end portion of the engagement latch portion, wherein the guide portion has a width in the circumferential direction smaller than that of the press-fitted portion, and guides the engagement latch portion when the engagement latch portion is inserted into the engagement hole.

12. A method for manufacturing an electric motor, wherein the electric motor comprises: a stator which is housed in a motor case, and a rotor which comprises a shaft being rotatably supported by the motor case and a rotor body portion having a magnet disposed inside the stator; wherein
the method for manufacturing the electric motor comprises:
a working process in which a press working is performed on a magnet cover which has a circular cylinder portion, a turned-back portion that is integrally arranged in one end portion of the circular cylinder portion and protrudes inward in a radial direction, and an engagement latch portion that is integrally arranged on the turned-back portion;
an assembly process in which the rotor which comprises the rotor body portion having the magnet and the shaft is assembled; and
an insertion process in which the rotor is inserted into the magnet cover, and the engagement latch portion is engaged with the rotor to prevent rotation of the magnet cover with respect to the rotor, wherein the engagement latch portion extends inward in the radial direction from the turned-back portion, an engagement surface is arranged on an outer peripheral surface of the rotor, and in the insertion process, the engagement latch portion is engaged with the engagement surface, when a guide surface is arranged closer to one end surface side of the rotor body portion than the engagement surface, and when the engagement latch portion is moved toward the engagement surface, the guide surface guides the engagement latch portion, wherein a plurality of protrusions are arranged on a top end of the engagement latch portion, and the protrusions are engaged with the flat surface.

* * * * *